US011809200B1

(12) United States Patent
Dickens et al.

(10) Patent No.: US 11,809,200 B1
(45) Date of Patent: Nov. 7, 2023

(54) MACHINE LEARNING BASED RECONFIGURABLE MOBILE AGENTS USING SWARM SYSTEM MANUFACTURING

(71) Applicant: Florida A&M University, Tallahassee, FL (US)

(72) Inventors: Tarik J. Dickens, Tallahassee, FL (US); Jolie Breaux Frketic, Tallahassee, FL (US); Sean Psulkowski, Fernandina Beach, FL (US)

(73) Assignee: Florida A&M University, Tallahassee, FL (US)

( * ) Notice: Subject to any disclaimer, the term of this patent is extended or adjusted under 35 U.S.C. 154(b) by 508 days.

(21) Appl. No.: 17/247,300

(22) Filed: Dec. 7, 2020

Related U.S. Application Data

(60) Provisional application No. 62/944,871, filed on Dec. 6, 2019.

(51) Int. Cl.
 *B25J 9/16* (2006.01)
 *G05D 1/02* (2020.01)

(52) U.S. Cl.
 CPC .......... *G05D 1/0295* (2013.01); *B25J 9/1635* (2013.01); *B25J 9/1697* (2013.01); *G05D 1/0255* (2013.01)

(58) Field of Classification Search
 USPC ................................................ 700/245–264
 See application file for complete search history.

(56) References Cited

U.S. PATENT DOCUMENTS

| | | | | |
|---|---|---|---|---|
| 6,374,155 B1* | 4/2002 | Wallach | ............... | G05D 1/0295 701/25 |
| 6,438,456 B1* | 8/2002 | Feddema | ............. | G05D 1/0022 701/28 |
| 8,103,382 B2* | 1/2012 | Root | ....................... | H04L 67/12 709/204 |
| 8,380,349 B1* | 2/2013 | Hickman | .............. | H04L 67/303 701/25 |

(Continued)

OTHER PUBLICATIONS

Gunasekaran et al., Agile manufacturing: an evolutionary review of practices. Int. J. Prod. Res. 2018. vol. 57: 5154-5174.

(Continued)

*Primary Examiner* — Jonathan L Sample
(74) *Attorney, Agent, or Firm* — Owen G. Behrens; Smith & Hopen, P.A.

(57) ABSTRACT

Embodiments of the present invention include a collaborative manufacturing system utilizing a plurality of mobile agents. The mobile agents operate dual robotic arms to improve single and multi-material builds' efficiency. In some embodiments, the dual robotic arms work together in the same area to create multi-functional components. In addition, the mobile agents can change tool heads on the arms to allow for hybrid manufacturing such as pick and place, additive, and subtractive manufacturing. One or more mobile agents interact with other mobile agents, thereby increasing the end product's efficiency and quality. Mobile agents utilize swarm manufacturing techniques to improve the manufactured product's time efficiency further and use machine learning to adjust and re-assign mobile agents constantly.

10 Claims, 23 Drawing Sheets

(56) References Cited

U.S. PATENT DOCUMENTS

| | | | | |
|---|---|---|---|---|
| 9,205,886 | B1* | 12/2015 | Hickman | G05D 1/0274 |
| 9,637,310 | B1* | 5/2017 | Zou | G06Q 10/08355 |
| 9,870,002 | B1* | 1/2018 | Holmberg | G05B 19/00 |
| 9,998,931 | B2* | 6/2018 | Dow | B29C 64/393 |
| 10,065,317 | B2* | 9/2018 | Tan | B61G 5/08 |
| 11,110,608 | B2* | 9/2021 | Aaron | H04R 1/028 |
| 11,144,063 | B2* | 10/2021 | Loosararian | G01N 29/043 |
| 2002/0165638 | A1* | 11/2002 | Bancroft | G07F 17/16 |
| | | | | 700/245 |
| 2009/0281660 | A1* | 11/2009 | Schmidt | F41H 13/00 |
| | | | | 901/1 |
| 2013/0231779 | A1* | 9/2013 | Purkayastha | G05D 1/0088 |
| | | | | 700/258 |
| 2014/0365258 | A1* | 12/2014 | Vestal | G05D 1/0297 |
| | | | | 901/1 |
| 2015/0190925 | A1* | 7/2015 | Hoffman | B25J 9/161 |
| | | | | 901/47 |
| 2016/0271803 | A1* | 9/2016 | Stewart | B25J 11/0085 |
| 2017/0225336 | A1* | 8/2017 | Deyle | B25J 5/007 |
| 2017/0329307 | A1* | 11/2017 | Castillo-Effen | B25J 9/1661 |
| 2018/0021954 | A1* | 1/2018 | Fischer | B25J 13/089 |
| | | | | 700/253 |
| 2019/0287063 | A1* | 9/2019 | Skaaksrud | B60P 3/007 |
| 2019/0369641 | A1* | 12/2019 | Gillett | G05D 1/0027 |
| 2021/0046655 | A1* | 2/2021 | Deyle | B25J 9/1664 |

OTHER PUBLICATIONS

Gardan. Additive manufacturing technologies: state of the art and trends. Int. J. Prod. Res. 2015. vol. 54: 3118-3132.

Jassmi et al., Large-Scale 3D Printing: The Way Forward. IOP Conf. Ser. Mater. Sci. Eng. 2018 vol. 324: 012088.

Djuric and Urbanic. Using collaborative robots to assist with travel path development for material deposition based additive manufacturing processes. Comput.-Aided Des. Appl., 2018 vol. 15: 542-555.

Frketic et al., Automated manufacturing and processing of fiber-reinforced polymer (FRP) composites: An additive review of contemporary and modern techniques for advanced materials manufacturing, Addit. Manuf. 2017. vol. 14: 69-86.

Frketic et al., Dexterous Priting and Fabrication of Multi-Functional Parts: Design for Science and Engineering Education. Procedia Manufacturing. 2017. vol. 10: 1087-1096.

\* cited by examiner

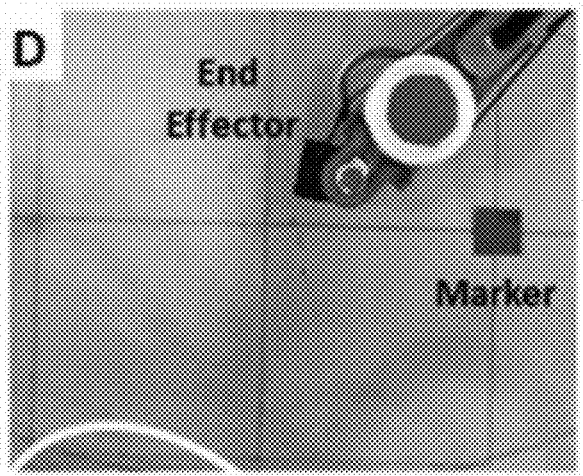
FIG. 6D
FIG. 6E
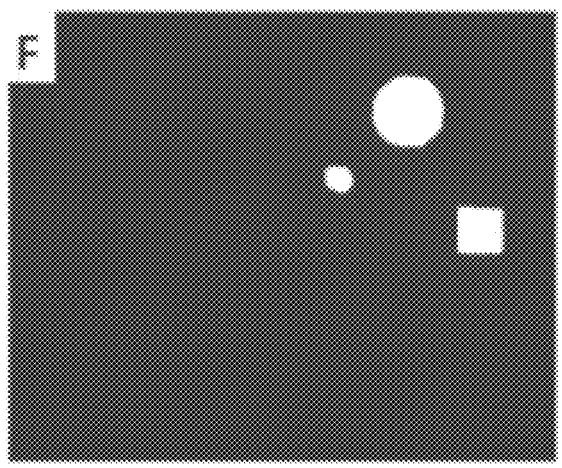
FIG. 6F

12

MACHINE LEARNING BASED RECONFIGURABLE MOBILE AGENTS USING SWARM SYSTEM MANUFACTURING

CROSS-REFERENCE TO RELATED APPLICATIONS

This nonprovisional application is a continuation of and claims priority to provisional application No. 62/944,871, entitled "MACHINE LEARNING BASED RECONFIGURABLE MOBILE AGENTS USING SWARM SYSTEM MANUFACTURING." filed Dec. 6, 2019 by the same inventors.

BACKGROUND OF THE INVENTION

1. Field of the Invention

This invention relates, generally, to additive and subtractive manufacturing systems. More specifically, it relates to reconfigurable mobile agents utilizing swarm manufacturing techniques to reduce overall manufacturing time and increase the quality of an end product.

2. Brief Description of the Prior Art

Significant drawbacks exist in existing gantry style equipment. First, traditional gantry style manufacturing equipment (GSME) is stationary, lacking the mobility to move around the manufacturing area. This limitation is compounded by the large blueprint and heavy servo motors of traditional GSME. Second, GSME includes large support columns and gantry equipment that restricts the movement of Selective Compliance Assembly Robot Arm (SCARA) movement within a build area. Third, GSME cannot quickly swap out end effector toolings, which increases the overall build time of a fabricated part (alternatively referred to as "end product") since end effectors must be manually interchanged. These and other drawbacks readily apparent to one of ordinary skill in the art result in significant inefficiencies during the manufacturing process.

With the introduction of precision additive manufacturing techniques, the complexity of manufactured end products rivals the possibilities of conventional manufacturing alternatives. However, the time investment required to bring an end product to completion is significant. Furthermore, this time commitment severely limits the practicality of an otherwise advantageous shift in manufacturing. Additionally, with the recent paradigm shift to rapidly manufacturing unconventional end products for Industry 4.0 (i.e., the ongoing automation of traditional manufacturing and industrial practices, also referred to as the Fourth Industrial Revolution) and the factory of the future, the industrial Additive Manufacturing (AM) complex continues an upward trajectory that will be worth an estimated $35.6 billion by 2024 [1].

This increase in popularity of AM is primarily due to the pervasive access to advanced manufacturing for personalization, customization, and product design turnover of future markets—commonly referred to as "agile manufacturing" [2]. Largely the most popular mode of AM, fused filament fabrication and modeling (FFF/M), demonstrates a high potential for fabricating multi-functional 3D-printed parts on-par with conventional processing methods. Moreover, FFF/M can grow amongst a variety of applications, heavily driven by a comprehensive material library of available materials [3] and ease in development [4]. In particular, the additive process is enabled through filament material fed via a motor through a heated nozzle, which then constructs sequential layers ending in a final end product geometry. Overall, the benefits inherent to the FFF/M process consist of (i) reduced material waste, (ii) flexibility in application deployment, and (iii) growing popularity among industry and makerspaces.

While many AM projects are completed via a singular machine, multiple devices can work in conjunction to complete a finalized end product. For example, collaborative or cooperative robotics is a field in which multiple robotic/humanoid systems work together to achieve a goal through planning and deliberation between the robots through local communication and coordination [5-8]. Recent works show a rise in decentralized multi-agent systems for both extrusion and hybrid additive manufacturing. Increasing the number of mobile agents during manufacturing facilitates larger and more complex end products in less time than convention means [9-13].

Similarly, contemporary assembly line manufacturing utilizes Multi-Degree of Freedom (MDoF) manipulators, which provides greater agility in smaller operational space than their gantry predecessors, extending to use in modular assembly lines [14]. The benefits in efficiency and precision from using MDoF manipulators largely outweigh the limitations in complex path planning, as industrial mobile agents can operate for thousands of continuous hours without positional error. Attempts to migrate manufacturing processes (both additive and subtractive) from GSME to MDoF manipulators have proved nearly equivalent at the production scale.

Thus, future manufacturing relies upon a modular assembly line in which the automated process assesses the build space and anticipates a rapidly changing environment [15]. For example, composite automation and manufacturing have quickly traversed from manual lay-up methods to large MDoF robotic arms that additively place composite prepreg (i.e., pre-impregnated fiber-based composite materials) in many directions [16]. Here, ubiquitous properties of collaborative robotic platforms are necessary to accommodate dynamic decision-making, with precision, of the composite assembly line.

Accordingly, what is needed is a collaborative system of mobile agents that utilizes swarm manufacturing techniques and machine learning to reduce the time required to manufacture an end product. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies, and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for improving upon the additive manufacturing process of end products using machine learning and a swarm of mobile agents is now met by a new, useful, and nonobvious invention.

The novel swarm system includes a plurality of mobile agents each in communication with an independent remote central controller. The plurality of mobile agents is configured to manufacture an end product within a manufacturing area. The swarm system comprises a first mobile agent. The first mobile agent including a frame having a first side opposite a second side, the frame defining a compartment therein between the first side and the second side. The compartment is enclosed within the frame via one or more detachable sides removably coupled to the fame.

A sensing component is removably disposed of within the compartment. The sensing component is adapted to be in wireless communication with the independent remote central controller and is adapted to be in wireless communication with the independent remote central controller and is adapted to transmit data to the independent remote central controller.

A receiver is removably disposed within the compartment, wherein the receiver is adapted to receive a set of instructions from the independent remote central controller. The set of instructions from the independent remote central controller is based on the data transmitted by the sensing component.

A base plate is secured to the first side of the frame. Furthermore, an attachment is coupled to the frame. The attachment includes an end effector disposed at a terminal end of the attachment and is adapted to manufacture an end product within the manufacturing area.

The first mobile agent also comprises a wheel coupled to the second side of the frame. The wheel is configured to linearly translate the first mobile agent from a first position to a second position within the manufacturing area based on the set of instructions.

In an embodiment, the first mobile agent further comprises an ultrasonic detector configured to calculate a void content within the end product. Furthermore, in yet another embodiment, the attachment of the first mobile agent is a robotic arm having a motor configured to control the movement of the robotic arm within the manufacturing area. In an embodiment, the first mobile agent further comprises a microphone in mechanical communication with the frame of the first mobile agent. The microphone is adapted to analyze acoustical energy generated by the motor during the operation of the robotic arm. The acoustic energy received by the microphone is transmitted to the remote central controller to optimize the manufacturing of the end product.

In an embodiment, the first mobile agent further comprises a camera in mechanical communication with the frame of the first mobile agent. The camera is configured to capture video data from within the manufacturing area. The video data is wirelessly transmitted to the independent remote central controller to optimize the manufacturing of the end product.

A second mobile agent includes a frame having a first side opposite a second side. A wheel is coupled to the second side of the frame and configured to linearly translate the second mobile agent from a first position to a second position within the manufacturing area. In an embodiment, the wheel is an omni-directional wheeling that permits each of the first and the second mobile agents to independently linearly translate within the manufacturing area.

The second mobile agent further comprising a print bed including a bottom surface secured to the first side of the frame. The bottom surface is configured to provide a surface for a deposit of a material in the form of a filament, thereby manufacturing an end product on the print bed's top surface. In an embodiment, the print bed of the second mobile agent further includes an adhesive disposed on the top surface of the print bed. The adhesive is configured to prevent the end product from being disposed during the manufacturing process.

The first mobile agent is configured to manufacture the end product on the second mobile agent's print bed based on the set of instructions received by the first mobile agent from the remote central controller.

In an embodiment, the attachment is a mobile inkjet printer including a gantry support structure secured to the base plate. The gantry support structure supporting a print head thereon. The print head is configured to translate in an x-axis, y-axis, and z-axis with respect to the base plate. The inkjet printer is configured to print the end product on the print bed of the second mobile agent.

In an embodiment, the first mobile agent further comprises a second attachment coupled to the base plate, such that the second attachment is secured to the frame. The second attachment being a robotic arm adapted to manufacture the end product.

In yet another embodiment, the end effector of the first mobile agent is a print head configured to deposit an amount of filament onto the print bed of the second mobile agent, such that the print head of the first mobile agent is configured to manufacture the end product on the print bed of the second mobile agent.

In an embodiment, the swarm system further comprises a third mobile agent. The third mobile agent includes a frame having a first side opposite a second side. A wheel is coupled to the second side of the frame and is configured to linearly translate the third mobile agent from a first position to a second position within the manufacturing area. Gantry support is secured to the first side of the frame and is coupled to a print head that is configured to deposit the filament to the top surface of the print bed of the second mobile agent. Each of the first and the third mobile agents is configured to manufacture the end product on the print bed of the second mobile agent based on the set of instructions received by the first mobile agent from the independent remote central controller.

The novel method of reducing the manufacturing time of single and multi-material build comprises the following steps. Providing a plurality of mobile agents within a predetermined manufacturing area. Each agent of the plurality of agents including a frame having a first side opposite a second side. The frame defining a compartment therein between the first side and the second side. The compartment enclosed within the frame via one or more detachable sides removably coupled to the frame. A sensing component is removably disposed within the compartment wherein the sensing component is adapted to be in communication with an independent remote central controller and adapted to transmit data to the independent remote central controller collected from the sensing component. A receiver is removably disposed of within the compartment. The receiver is adapted to receive instructions from the independent remote central controller—the set of instructions based on the data transmitted by the sensing component.

Each mobile agent of the plurality of mobile agents further comprising a base plate secured to the first side of the frame. An attachment is coupled to the base plate, such that the attachment is secured to the frame. The attachment including an end effector disposed at a terminal end of the attachment and is adapted to interact with one or more of the plurality of mobile agents within a manufacturing area.

Next, the method proceeds to calculate, via the independent remote central controller, a travel path for each mobile agent. A first set of instructions is then transmitted, via the independent remote central controller, that includes the travel path for each of the mobile agents and a first task. The first task including the manufacturing instructions for the end product being manufactured by the plurality of mobile agents within the manufacturing area.

The manufacturing of a second end product is then optimized by collecting, via the sensing component, data collected during the step of performing, via the plurality of mobile agents, the manufacturing of the first end product. The data is then transmitted to the independent remote central controller, where it is processed using machine learning to optimize the manufacturing efficiency of the second end product. From there, a second task is formulated via the independent remote central controller. The second task is optimized based on the first end product, thereby increasing the efficiency of the manufacturing of the second end product.

In an embodiment, the method further comprises the steps of determining the number of mobile agents required to perform the first task via the remote central controller. Next, the total number of mobile agents within the manufacturing area is monitored such that one or more supplemental tasks are automatically generated by the independent remote central controller depending on the total number of mobile agents within the manufacturing area, thereby continuously optimizing the manufacturing process of the end product based on the total number of mobile agents available.

In an embodiment, the method further comprises the step of embedding an electronic device within the end product during the step of performing, via the plurality of mobile agents, the manufacturing of the first end product, such that the electronic device embedded within the first end product transmits data collected from the electronic device to the independent remote central controller. In an embodiment, the electronic device is selected from the group consisting of a strain sensor, a temperature sensor, and a near-field communication sensor.

These and other important objects, advantages, and features of the invention will become clear as this disclosure proceeds.

The invention accordingly comprises the features of construction, combination of elements, and arrangement of parts that will be exemplified in the disclosure set forth hereinafter, and the scope of the invention will be indicated in the claims.

BRIEF DESCRIPTION OF THE DRAWINGS

For a fuller understanding of the invention, reference should be made to the following detailed description, taken in connection with the accompanying drawings, which:

FIG. 6D depicts a frame of a video captured during the printing process of an end product.

FIG. 6E depicts a processed form of the frame of the video captured during the printing process of FIG. 6D highlighting the shaded area.

FIG. 6F depicts a binarized version of the frame of FIG. 6E.

DETAILED DESCRIPTION

Figure 1:
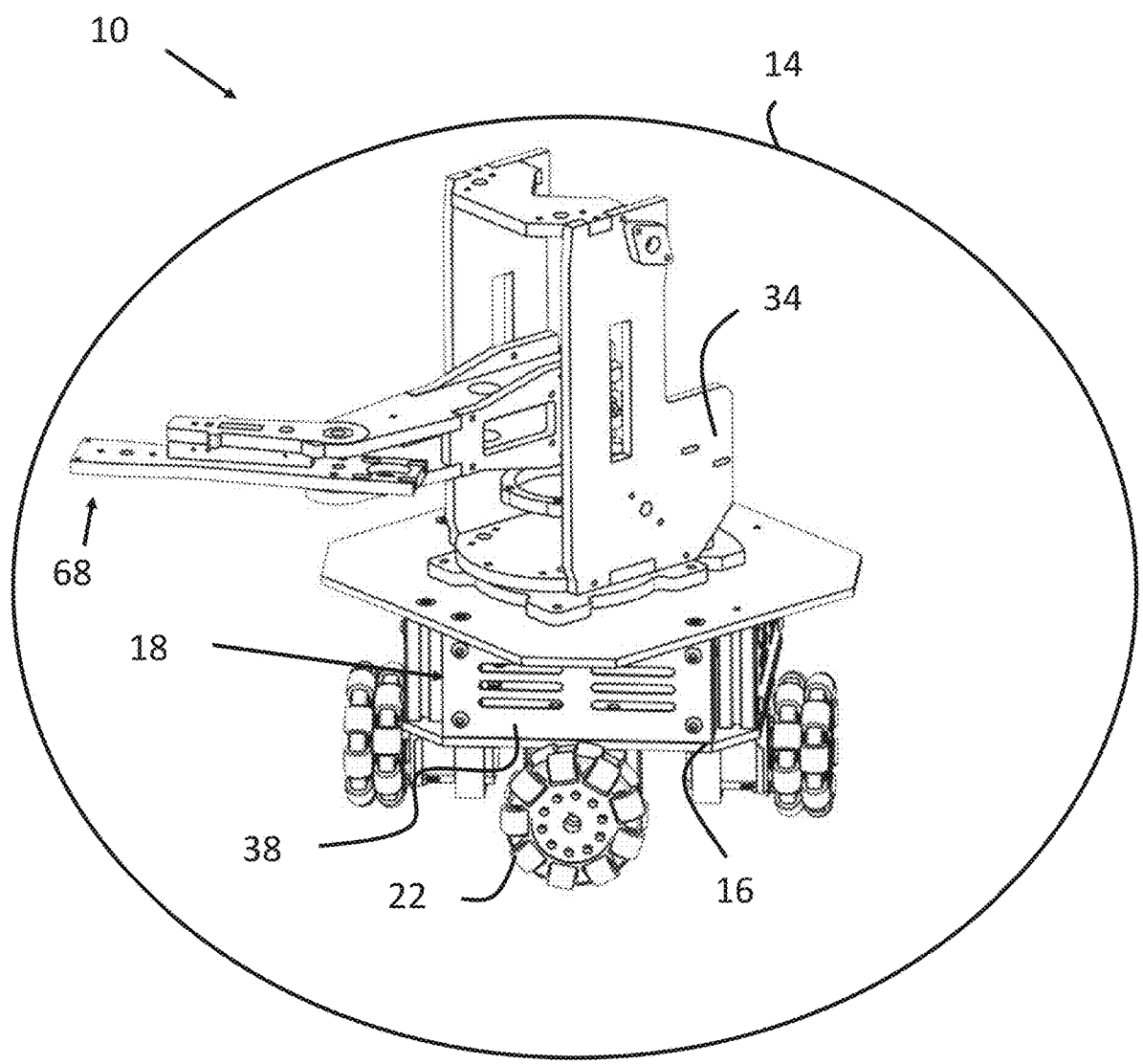
FIG. 1 is a perspective view of a mobile agent in the form of a mobile agent configured having a SCARA attachment.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a newly developed collaborative system to increase efficiency and reduce the overall build time for single and multi-material builds using a swarm of mobile agents. As the demand climbs for high throughput manufacturing of complex multi-functional products, so does the acquisition rate of autonomous systems in the industrial settings. As such, a collaborative additive manufacturing system has been developed to fulfill this need utilizing a SCARA system design that bridges current and future manufacturing technology gaps as Industry 4.0 becomes a reality.

Compared to traditional GSME, the collaborative SCARA system's reduced footprint lend itself to operating in restricted spaces (e.g., close-quarter cooperation in thermoplastic extrusion, pick-and-place, CNC drilling, etc.). Furthermore, the simultaneous extrusion of two print nozzles during thermoplastic extrusion in a confined space allows for a multi-material deposition without the idle time typically induced during conventional manufacturing means to change material filament intermittently.

Unlike conventional "dual-body material nozzles" typical of gantry-style printers (e.g., GSME), a collaborative system enables simultaneous material deposition from distinct mobile agents absent of idle time during multi-material operations. The same act of collaborative printing in a confined space would be physically impossible for GSME, as only a single carriage can independently traverse the rails at a given time to avoid a collision—nullifying the opportunity to operate in a shared confined spaced [17-18]. Independent deposition of collaborative SCARA arms of mobile agents enables multi-material extrusion (as well as hybrid additive practices through reconfigurable tooling) free of idle time, resulting in the efficient fabrication of complex parts via a single system.

While attempts have been made to create efficient additive manufacturing systems, as discussed above, such attempts failed to provide genuinely efficient, moveable, and accurate systems. To that end, the present invention includes a collaborative system comprising a series of mobile agents working together using swam methodologies. Each mobile agent comprises a base portion that permits the coupling of various attachments. For example, mobile agents may include a robotic arm with swappable end effector portions that facilitate the efficient manufacturing of end products. Located beneath the base of the mobile agents is a compartment defined by the frame and outer walls. The compartment houses one or more internal components that help facilitate both the mobile agents' movement and operation, including its machine learning abilities, to quickly and efficiently manufacture high-quality end products. The collaborative system is discussed in greater detail below, beginning with a discussion of the novel mobile agents.

Mobile Agent Design

Embodiments of mobile agent 10 are illustrated in FIGS. 1-5. Mobile agent 10 participates in collaborative manufacturing to reduce the manufacturing time of end product 12. Various embodiments of mobile agents 10 are illustrated in FIGS. 1-5, each of which is configured to move within manufacturing area 14. Collaborative systems utilizing swarm manufacturing concepts comprise a plurality of mobile agents 10. Each of the plurality of mobile agents 10 is configured to interact within the same manufacturing area 14 for the efficient manufacturing of end product 12. Collaborative manufacturing systems utilizing a plurality of mobile agents 10 reduce the overall manufacturing time of single and multi-material builds, thus improving upon the prior art.

General Structure of Each Mobile Agent

Figure 2:
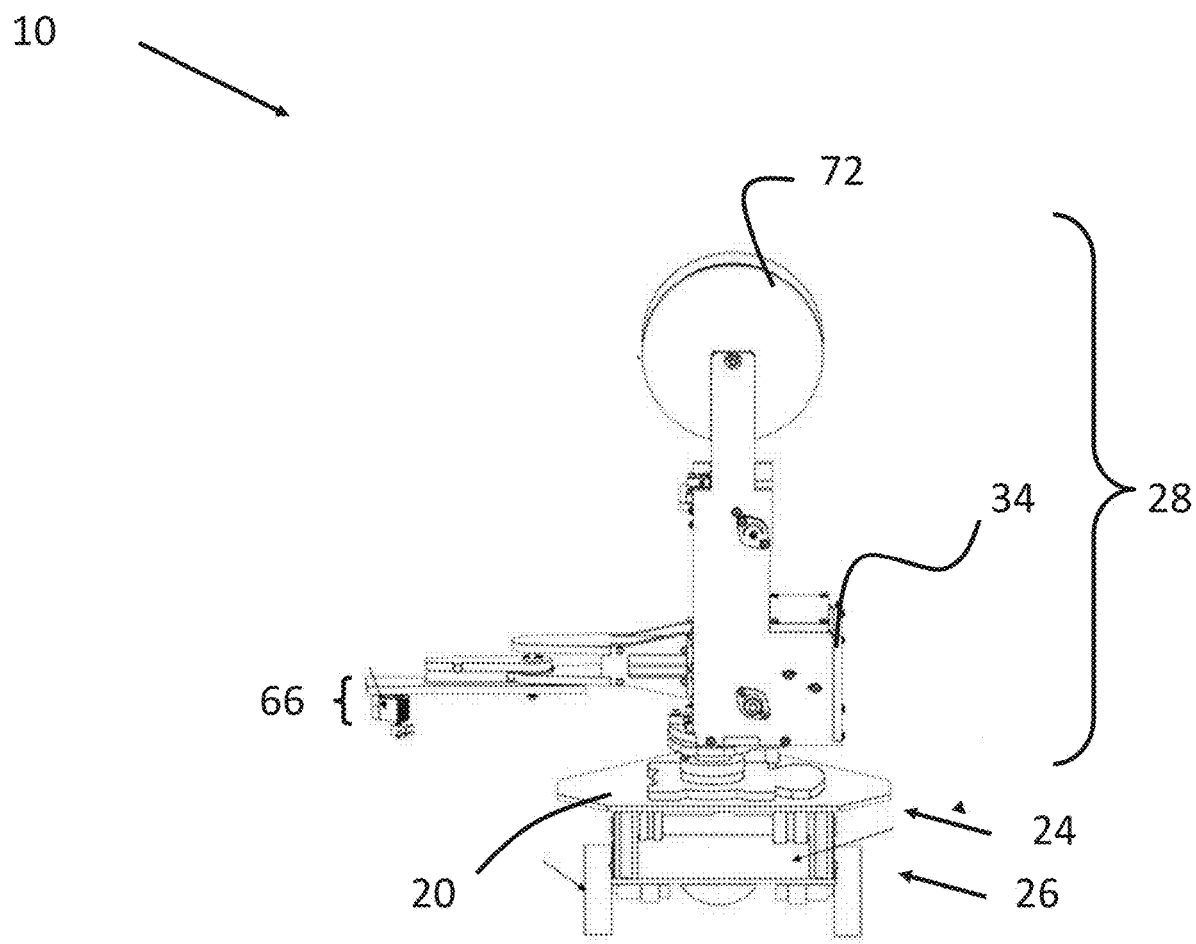
FIG. 2 is a perspective view of a mobile agent having a SCARA attachment that includes a material stock and reconfigurable tooling attached to the terminal end of the robotic arm.
Figure 3:
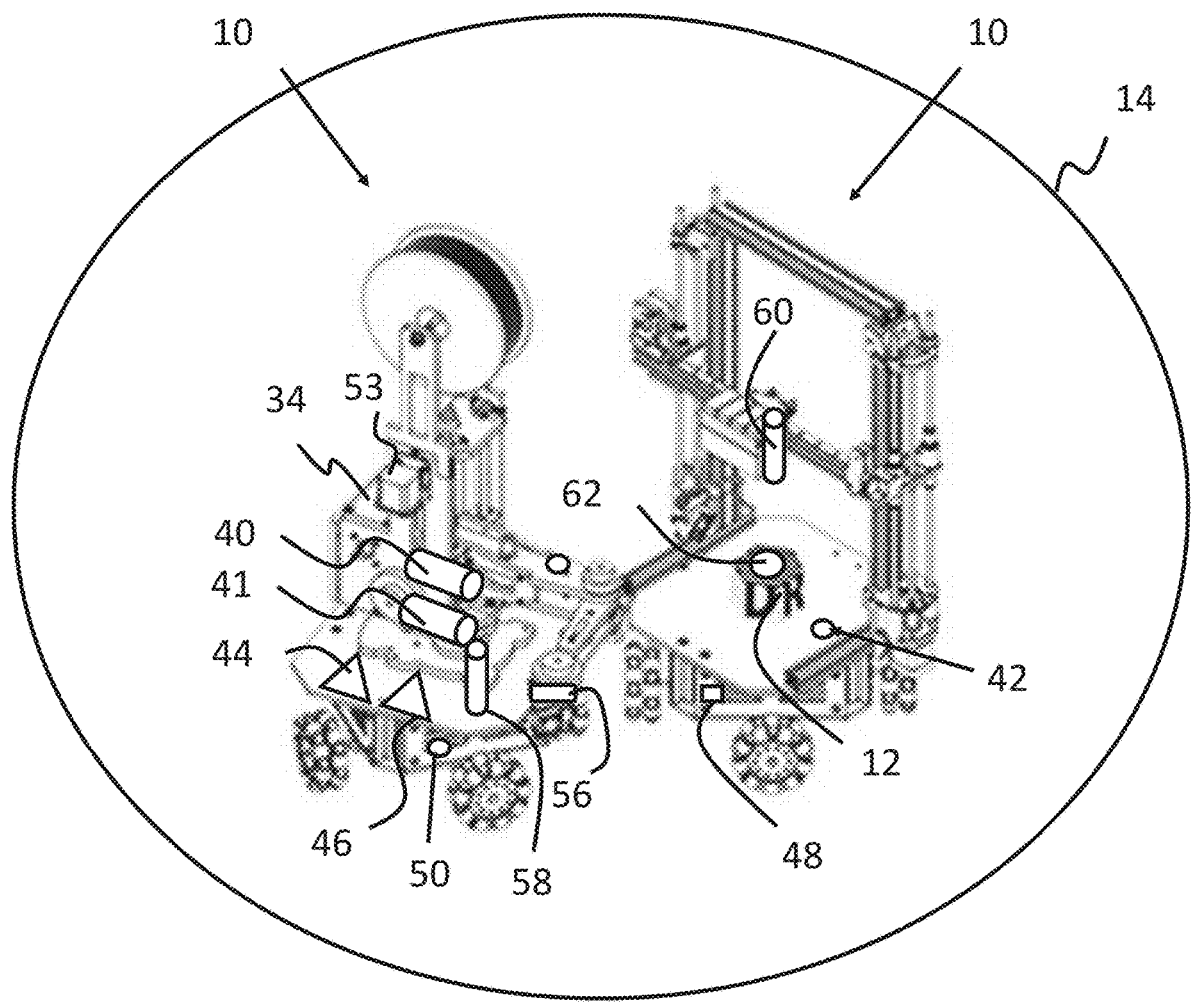
FIG. 3 depicts an in-use embodiment of two mobile agents interacting with one another to build an end product.
Figure 3:
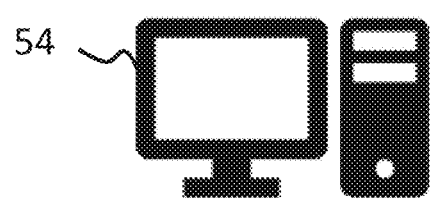

Generally, as shown in FIGS. 1-2, mobile agents 10 include frame 16, compartment 18, base plate 20, mobility mechanism 22, and attachment 28. Frame 16 includes top portion 24 and an opposite bottom portion 26 adapted to provide structural support of mobile agent 10. Mobility mechanism 22 is in mechanical communication with and coupled to bottom portion 26 of frame 16. Mobility mechanism 22 is adapted to facilitate the translation of mobile agent 10 within manufacturing area 14, such as along a ground surface. Ideally, mobility mechanisms 22 are omni-directional wheelings; however, mobility mechanism 22 may also include standard wheels, tracks, mecanum wheelings, balls, ball bearings, rollers, castor wheels, or any other means capable of translating mobile agent 10 from a first position to a second position within manufacturing area 14.

Compartment 18 provides storage for components of mobile agent 10 necessary for the manufacturing of end product 12. Moreover, compartment 18 is formed within frame 16, such that compartment 18 is defined by top portion 24 and bottom portion 26. Furthermore, compartment 18 is enclosed by sides 38 that are removably coupled to frame 16. In an embodiment, sides 38 span from top portion 24 to bottom portion 26 of frame 16 and provide ease of access to components disposed within compartment 18 for repair, replacement, maintenance, and swapping of components depending on the specific end product 12 being manufactured. The components within compartments 18 will be described in greater detail below.

Furthermore, base plate 20 is coupled to top portion 24 of frame 16. Base plate 20 provides a mount point for which one or more attachments 28 can be mechanically coupled to mobile agent 10. In particular, attachment 28 (such as SCARA 34) permits mobile agent to interact with manufacturing area 14.

SCARA Attachment

As depicted in FIGS. 1-2, mobile agent 10 includes attachment 28 thereto. In an embodiment, attachment 28 includes SCARA 34. End effector 66 is positioned at terminal end 68 of SCARA 34 and configured to interact with a second mobile agent 10, the manufacturing area 14, GSME, or end product 12. Furthermore, end effector 66 includes reconfigurable toolings, such as articulated arm solutions for multi-material and hybrid manufacturing needs. Additionally, mobile agent 10 may include reconfigurable tools to facilitate multiple manufacturing operations within manufacturing area 14. Reconfigurable tooling may include clamps, forceps, fingers, soldering tips, CNC drilling bits, print heads, hot ends, and other tools recognized by one of ordinary skill in the art. In embodiments requiring secondary materials, such as print heads, material stock 72 is configured to contain filament for deposit that is coupled with SCARA 34, as shown in FIG. 2.

Components of the Mobile Agent

As discussed above, various components may be housed within mobile agent 10 for use during an additive manufacturing process. For example, referring to FIG. 3, an embodiment of compartment 18 of mobile agent 10 includes camera 40 adapted to capture video data from within manufacturing area 14. In such an embodiment, camera 40 is configured to capture a constant stream of video data of x-, y-, and z-positioning data to ensure controlled material placement and efficient manufacturing of end product 12. Camera 40 may be positioned on base plate 20, within compartment 18, or coupled with attachment 28 (such as SCARA 34), such that the positioning of camera 40 facilitates efficient end product 12 manufacturing.

Additionally, camera 40 provides a feedback loop to monitor attachments 28 and adjust for any error during manufacturing. Furthermore, video data captured by each camera 40 is transmitted to a remote (located external to mobile agent 10) or onboard computer (located within compartment 18), where the video data is processed via machine learning software. If the software detects an error, the remote or onboard computer can transmit corrective data to mobile agent 10, thereby increasing the overall manufacturing efficiency and accuracy of subsequent end products 12. The optimization of end product 12 manufacturing will be discussed in greater detail below. Furthermore, in the event of end product 12 failure, camera 40 functions to detect the specific failure that occurred. Camera 40 facilitates position control, task scheduling, and is used during optimization of end product 12 manufacturing. In particular, video data captured by camera 40 is transmitted to a computing node for use during machine learning process to recognize potential failures during printing and improve steps performed by mobile agent 10 in a subsequent print, thereby optimizing the manufacturing process of end product 12.

In an embodiment, camera 40 is capable of viewing visible and infrared (IR) wavelengths of light. In particular, mobile agent 10 includes thermal IR camera 41 that is configured to collect heat signals and readings during end product 12 manufacturing. Furthermore, mobile agent 10 may include thermostats or thermistors 42 capable of collecting thermal data during the collaborative manufacturing process. Similar to that of camera 40, the data captured by IR camera 41 and thermostats 42 is transmitted to a computing node for processing and optimization of mobile agent 10 functionality.

In an embodiment, mobile agent 10 includes receiver 53 that is configured to transmit and receive the first set of instructions from remote central controller 54 along with sensor data received by the electronic devices 62, such as camera 40.

In an embodiment, mobile agent 10 captures and monitors acceleration data via an onboard accelerometer 44. The collection of acceleration data enables a feedback loop of positional data. When the acceleration data is used in conjunction with similar velocity and positioning sensors, the collective sensors enable learned control schemes of a computing node in communication with mobile agent 10 to mitigate positional error propagation—typically induced by inertial effects of movement of attachment 28.

In an embodiment, mobile agent 10 includes motor encoders 46 capable of measuring and providing real-time positioning feedback transmitted to position controller 48, which is a computing node coupled to one of mobile agents 10. Data from motor encoder 46 leads to on-the-fly velocity profiles that are analyzed using artificial intelligence to reduce the overall time completion and mechanical product performance in the overall manufacturing of end product 12.

Mobile agent 10 may include microphone 50 configured to capture audio data within the manufacturing area 14. In particular, microphone 50 captures the acoustic measurements of a motor of attachment 28, which correlates to attachment 28 velocity over time. By utilizing machine learning, such positioning error of attachment 28 is significantly reduced.

In an embodiment, mobile agent 10 includes pressure sensor 56, which maps the position of attachment 28 in 3D space within manufacturing area 14, thereby permitting the collaborative system to mitigate operational inconsistency.

During the collaborative manufacturing of end product 12, embodiments of mobile agent 10 further include ultrasound device 58. Ultrasound device 58 provides a non-destructive means to measure the porosity and interlayer bonding of end product 12 during the manufacturing of end product 12. As such, via the data captured via ultrasound device 58, the collaborative system can predict and/or prevent mechanical failure points in end product 12. In particular, the "void content," or unfilled pores within an object that reduces the object's strength, of end product 12 is determined by ultrasound device 58. Ultrasound device 58 transmits the void content data to computer 54 for analysis. The analysis can then be analyzed by a computing node utilizing machine learning to learn from the previously manufactured end product 12 and optimize or maintain the structural integrity of the future end product 12 manufactured in the future.

Mobile agent 10 may further include an array of IR lasers 60 adapted to measure and provide real-time information on a position of attachment 28 during operation. In addition, IR laser 60 measures and provides end product 12 morphology data during manufacturing. In particular, by comparing the actual shape of the previous end product 12 to its expected shape via IR laser 60, irregularities can be identified and learned from to prevent future manufacturing errors of subsequent end products 12.

Furthermore, end product 12 may be manufactured to include one or more embedded sensors, antennas, taggants, and other electronic devices (collectively referred to as electronic devices 62). Such electronic devices 62 are disposed within end product 12 during its manufacture. For example, strain sensors, such as a resistive foil strain gauge, are embedded into end product 12 and collect data for determining the overall quality of end product 12 during manufacturing, evaluate the performance of end product 12, and monitor the structural health of end product 12 during its lifetime. Strain sensors convert force, pressure, tension, weight, or other external and/or internal forces acting on end product 12 into a change in electrical resistance, which is then measured and quantified into an optimizable variable.

In addition, antennas may be embedded within end product 12 and configured to transmit and/or receive data collected from embedded sensors and electronic devices 62. For example, near-field communication electronic devices may be embedded within end product 12 and act as embedded taggants, or markers, for an interconnected factory. In an embodiment, each fabricated end product 12 includes a unique identifier that allows for analyses of end product 12 to completed, such as to measure a performance of end product 12 post-manufacture. Taggants are radio frequency microchips used in automated identification and data capture, such as using radio waves to track and identify end products 12.

The components described above are examples of components usable in an additive manufacturing process; however, it should be understood that the components described herein are not exhaustive of all components that could be implemented by one or more mobile agents 10 in the collaborative system, since each mobile agent 10 can facilitate several different streams of task-specific data collection. Additionally, components may be housed within compartment 18, or positioned elsewhere on mobile agent 10, such as attachment 28 or base plate 20.

Mobile Agent—Mobile Print Bed Attachment

Figure 4:
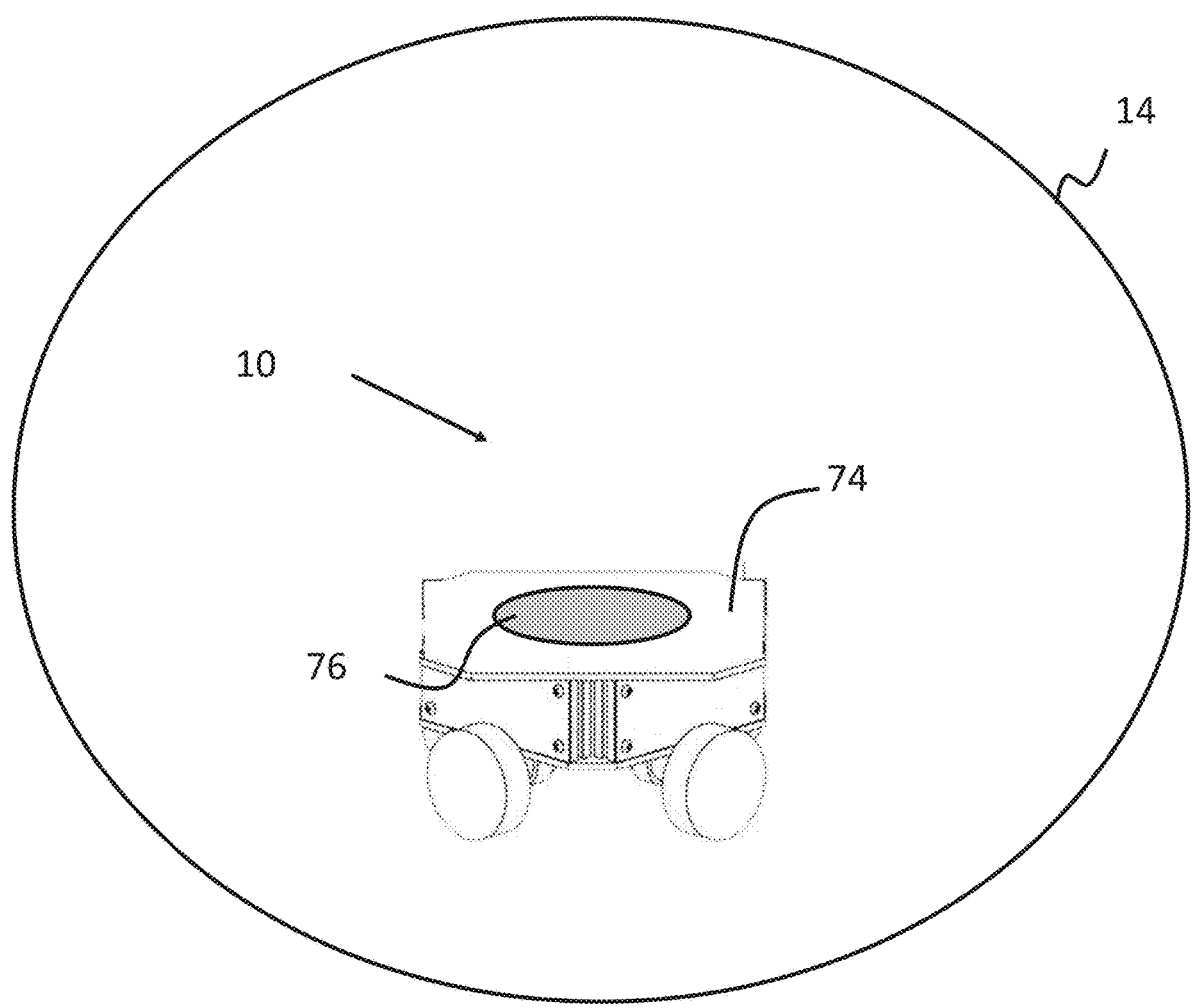
FIG. 4 is a perspective view of a mobile agent configured as a mobile print bed.

In an embodiment as depicted in FIG. 4, mobile agent 10 includes print bed 74. Print bed 74 is adapted to provide a surface for which end product 12 may be manufactured. Print bed 74 is disposed on mobile agent 10 at a position above mobility mechanism 22, such that print bed 74 is elevated from a ground surface, and such that print bed 74 can be transported around manufacturing area 14 as mobile agent 10 translates within manufacturing area 14. As such, end product 12 disposed on print bed 74 is transportable about manufacturing area 14.

For example, once the manufacturing of end product 12 is complete, mobile agent 10 configured having print bed 74 as attachment 28 may transport completed end product 12 to the shipping department. Alternatively, mobile agent 10 having print bed 74 attachment 28 may transport end product 12 to various stationary manufacturing devices or manufacturing stages, not capable of having a mobile version. Furthermore, print bed 74 may include adhesive layer 76 to prevent end product 12 from being displaced during manufacture or transport within manufacturing area 14.

Mobile Agent—Mobile Inkjet Printer Attachment

Figure 5:
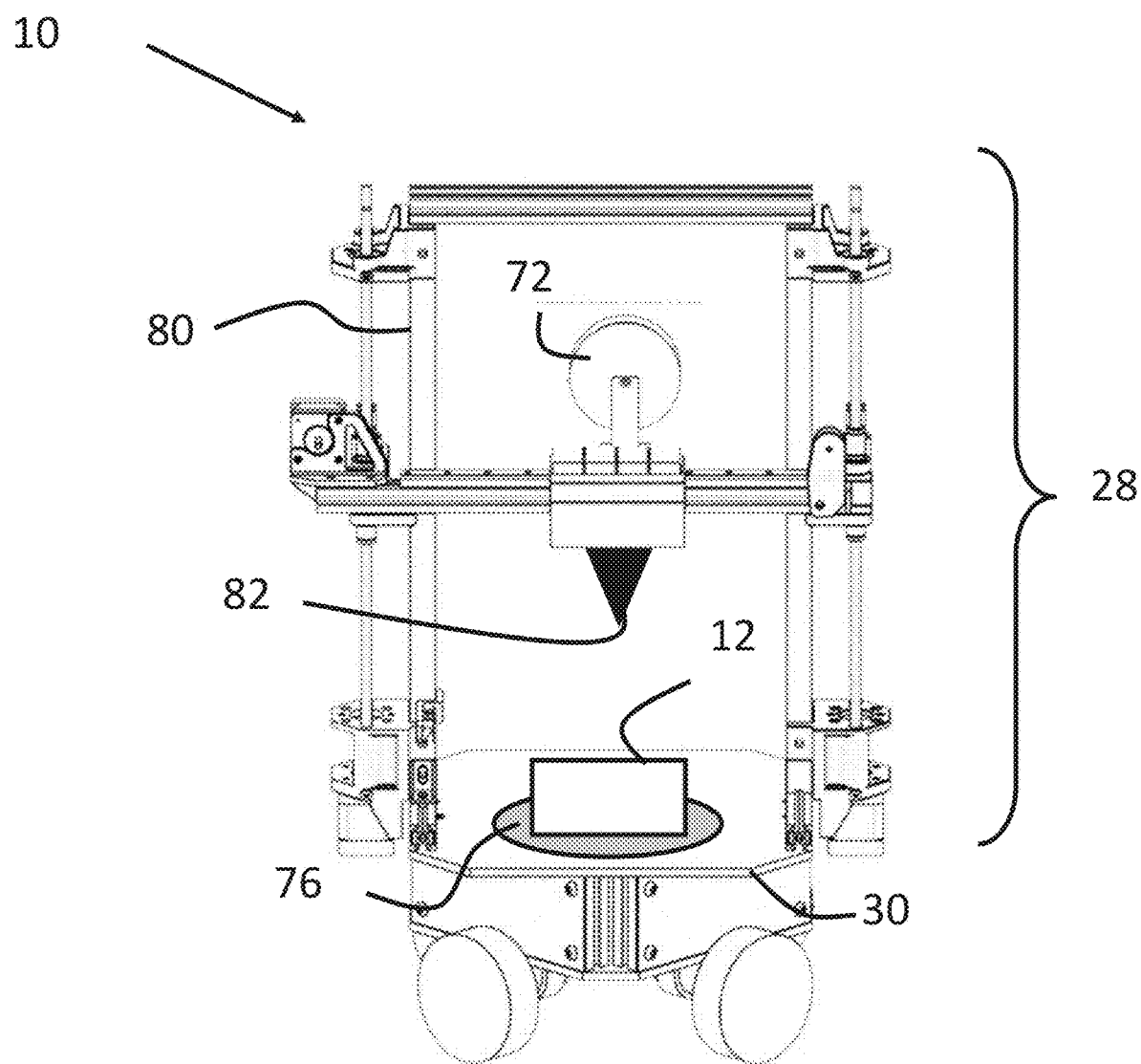
FIG. 5 is a perspective view of a mobile agent in the form of a mobile inkjet printer.

In yet another embodiment, FIG. 5 depicts mobile agent 10 configured in the form of a mobile inkjet printer. Specifically, mobile agent 10 includes gantry support 80 in mechanical communication with print head 82. Gantry support 80 permits print head 82 to translate along an x-, y-, and/or z-axis with respect to print bed 30. Moreover, print head 82 is configured to deposit one or more types of filament or print materials for the building and manufacture of end product 12. During the printing/manufacturing process, the filament is deposited between various printed layers resulting in the formation of end product 12. Such printing technology permits a wide variety of end product 12 utilizing conductive materials for circuitry, heat-activated adhesive materials for reinforcement, and functional materials for manufacturing embedded electronic devices, such as sensors, batteries, and capacitors.

End Product Optimization/Smart Calibration

Still referring generally to FIGS. 1-5, the manufacturing process of end product 12 is continuously optimized after each end product 12 is manufactured. The optimization process is described in detail below with reference to an embodiment of mobile agent 10 having attachment 28 configured as dual SCARA 34. However, it is appreciated that the following optimization process can be performed with various embodiments of attachment 28 coupled with mobile agent 10.

Controls Architecture

An open-source Marlin firmware, modified for a single-arm SCARA 3D printer setup, controls the collaborative SCARA 34. The program interprets G-Code, or computer numerical control (CNC) programming language, from the slicing software into the mechanical movement for the arms, PID (proportional-integral-derivative) temperature control, and precise material extraction. An additive manufacturing application, such as that marketed under the trade name Repetier-Host™ is used to communicate G-Code directly to SCARA 34. An image slicing software, such as that marketed under the trade name Slicr™, is used to create the G-Code files from a created computer aided design (CAD) file format, such as *.stl (standard triangle language), for printing, and the created G-Code is transmitted directly to SCARA 34 via Repetier-Host™. For printing collaboratively, separate instances of Repetier-Host™ run simultaneously to control the two SCARA 34 systems.

Machine Vision Error Analysis

Figure 6A:
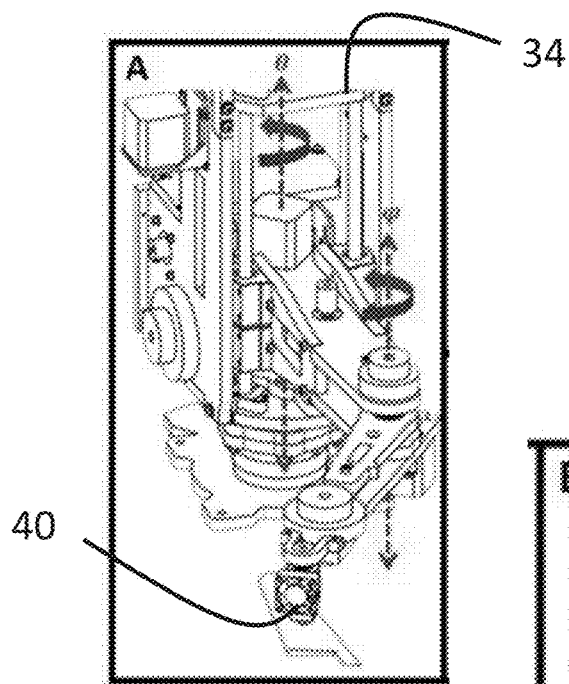
FIG. 6A is an isometric view of SCARA with axis of rotation.
Figure 6B:
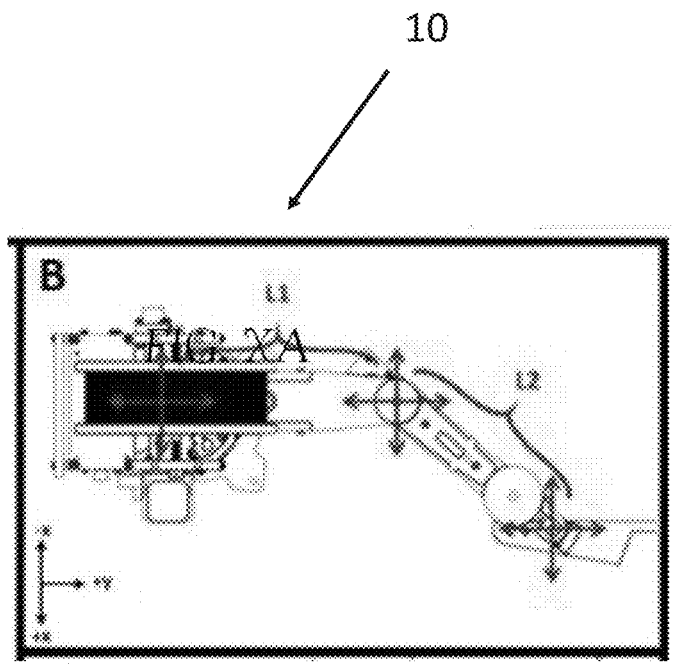
FIG. 6B is a top view of SCARA of FIG. 6A.
Figure 6C:
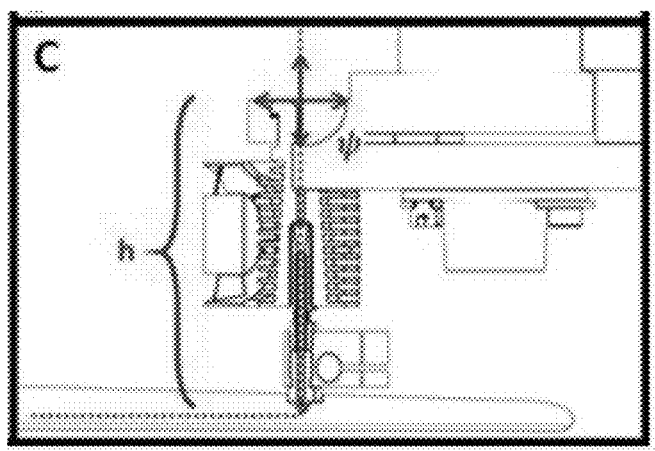
FIG. 6C depicts a cross-section of FIG. 6A illustrating material deposition path dependent on SCARA infrastructure.

FIGS. 6A-6G depict an embodiment of visual camera 40 subsystem that is incorporated as a means for "smart calibration" of the collaborative system. A computer-vision process utilizing the 1920×1080 pixel imaging field interprets the manipulator position during operation, translating captured frames from camera 40 of mobile agent 10 into global coordinates that allow for trajectory and orientation determination. A series of scripts are written via a design and analysis program, such as that marketed under the trade name MATLAB®, to segment entire video clips into their individual frames and then segmented across the spectrum to create regions of interest that are tracked in real-time. The regions of interest are denoted by trackers of a primary color, in which positioning occurs via calculating the centroid of the region and the bounding box to ensure proper registration of the objects. FIG. 6D depicts the raw, unprocessed footage taken from overhead camera 40. FIG. 6E depicts the primary separation of the tracker's identified pixels mounted to the top of SCARA 34. A Gaussian distribution is compared with a trained sample data to ensure the correct selection of the desired trackers.

Figure 6G:
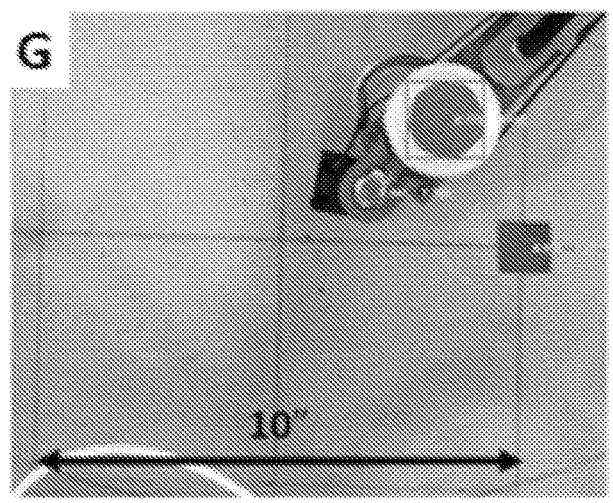
FIG. 6G depicts the frame of FIG. 6D having the centroids of the regions of interest and a bounding box.
Figure 6H:
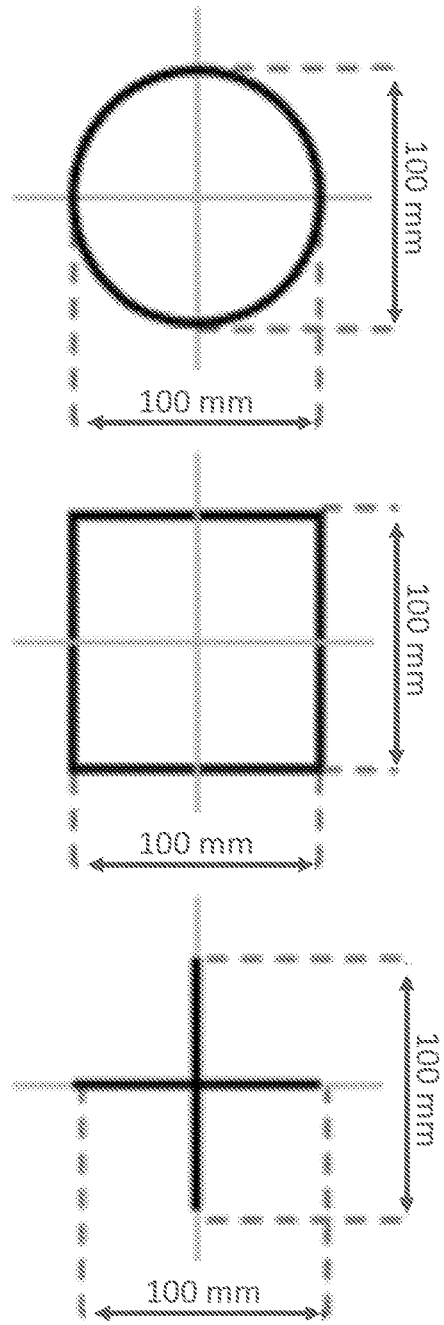
FIG. 6H depicts SCARA traverse paths for the introduction of variable inertial effects.

FIG. 6F shows the subtractive process of the desire green pixels from a black and white contrasted image. The image provides a binary comparison between markers and the surroundings to measure SCARA's 34 central position. FIG. 6G shows the calculation of the tracker's centroid in camera frame coordinates. A boundary box is drawn surrounding the acquired object for user verification purposes. This coordinate point is then subtracted from the origin trackers location; afterward, the resulting SCARA 34 location is translated into world frame coordinates using schematic parameters and compared to the arm's desired path through test trials seen in FIG. 6H. The shapes possess the same magnitude of 100 mm in both the X and Y direction and the identical midpoint of the bed center (i.e., 0,0).

The cross is selected to induce the largest shift in inertia as the arm immediately reverses direction upon reaching the outermost limits. The square trial is selected for its large footprint in the test area whilst offering a reduced shift in momentum than the cross trials with 90-degree turns. In an embodiment, the circle trial offered a smother study of similar limits of the square trial; here, there was the lowest shift in momentum as path travel was smooth and fluid. Trends analyzed are across a variety of inertial effects to isolate system properties under these conditions. Moreover, the shapes are selected to ensure a symmetry that better displays error propagation while the arm traverses the path's outer reaches.

Resolution of Single SCARA Prints

Referring to FIGS. 7A-7F, print selected exclusively for calibration purposes is used to visualize the actual resolution of an individual SCARA 34. The dimensional accuracy of end product 12 is compared to that of the CAD file in X-, Y-, and X-directions and the percent error of geometry with the corresponding direction is shown in FIGS. 7A-F. The largest dimensional variance is observed as an 11% increase in the Z-direction of the system. The latter measured a larger range of error between X and Y at 8.3% compared to 4.6%.

Figure 7A:
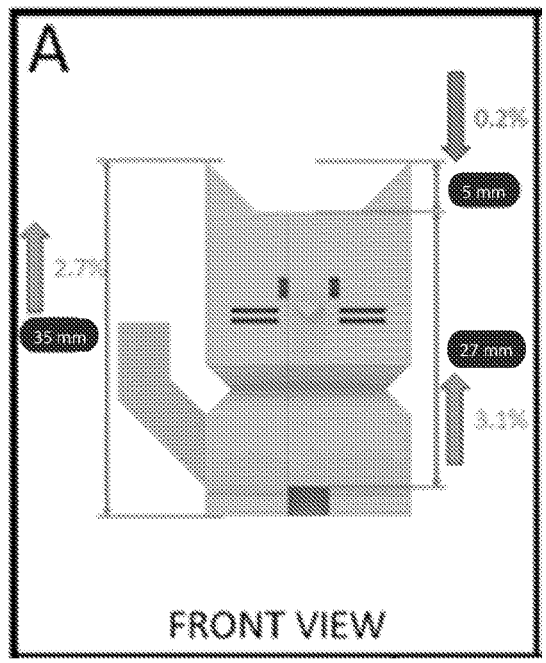
FIG. 7A is a front view of a printed end product showing the dimensional accuracy of a singular point based on the original CAD file.
Figure 7B:
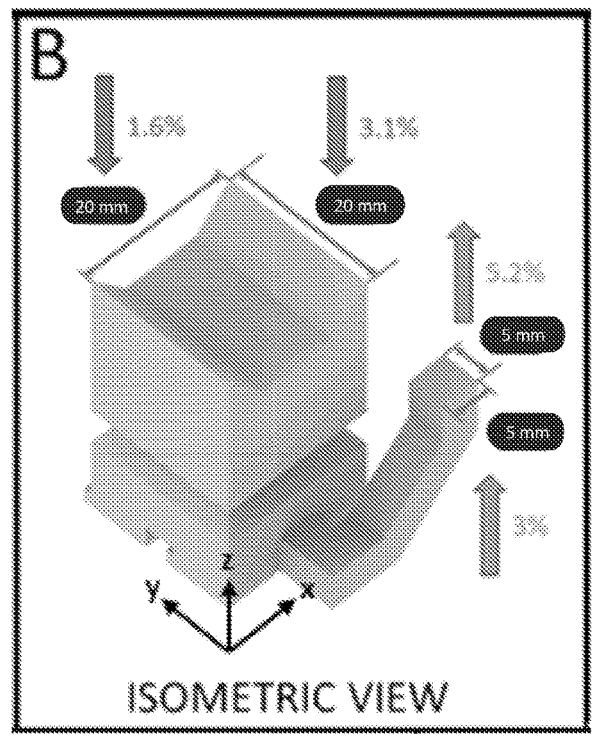
FIG. 7B is an isomeric view of a printed end product showing the dimensional accuracy of a singular point based on the original CAD file.
Figure 7C:
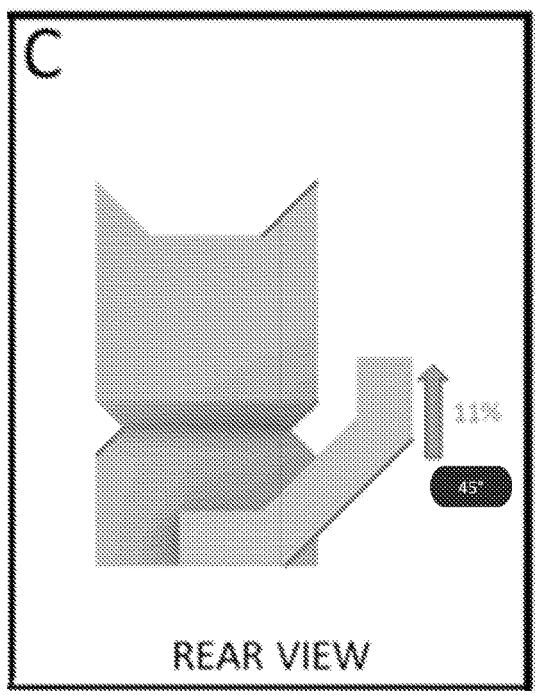
FIG. 7C is a rear view of a printed end product showing the dimensional accuracy of a singular point.
Figure 7D:
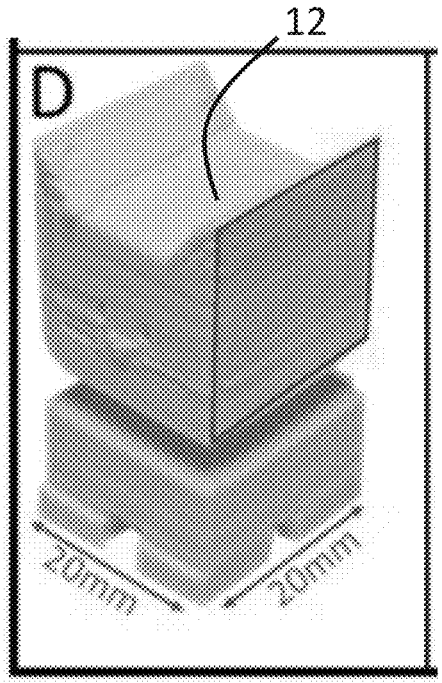
FIG. 7D shows the printed 'calibration' end product.
Figure 7E:
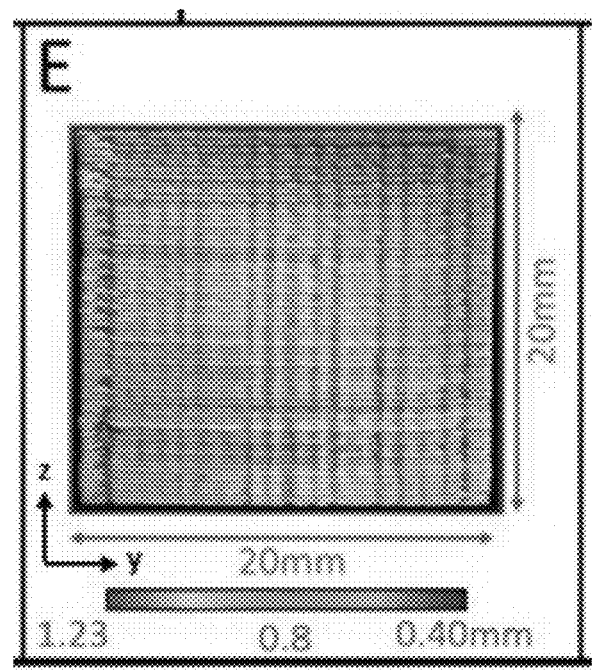
FIG. 7E depicts the regular ridge pattern of the end product.
Figure 7F:
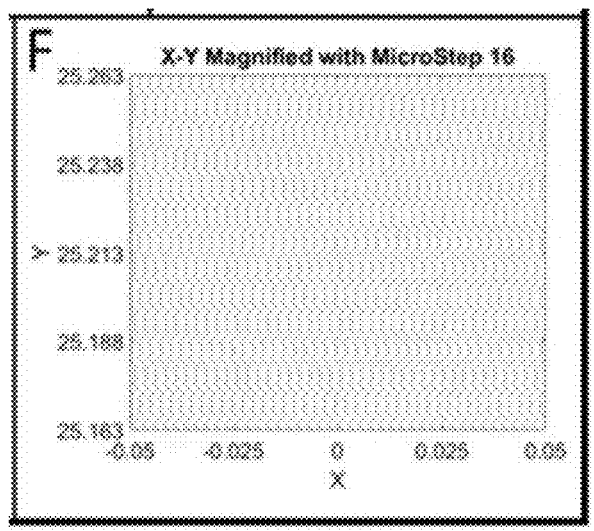
FIG. 7F depicts the theoretical resolution of a SCARA with a $\frac{1}{16}$ micro-step applied.

Since SCARA 34 is driven by stepper motors, step-size can be increased at the loss of holding-torque to increase the operational resolution of the printer. Operating procedures use 1/16 micro-stepping resulting in approximately 9.80% of total holding torque available during operation. Despite the increased resolution, recurring vertical ridges remained along the end product's flat sides, as seen in FIG. 7E. To ensure that micro-stepping was sufficient, the theoretical traversal points of the SCARA within a 1 mm square are seen in FIG. 7F. This resolution is determined from the physical lengths of the arms and the gearing of the motors combined with the boards' motor drivers' ability to micro-step. In a cartesian system, the resolution is a grid-like pattern, with the points being evenly distributed within the X and Y. However, the resolution in the SCARA shows a non-linear pattern, the observation of a pattern in the resolution is the result of the SCARA propagating inertial effects across variable resolution through the build area.

Figure 8A:
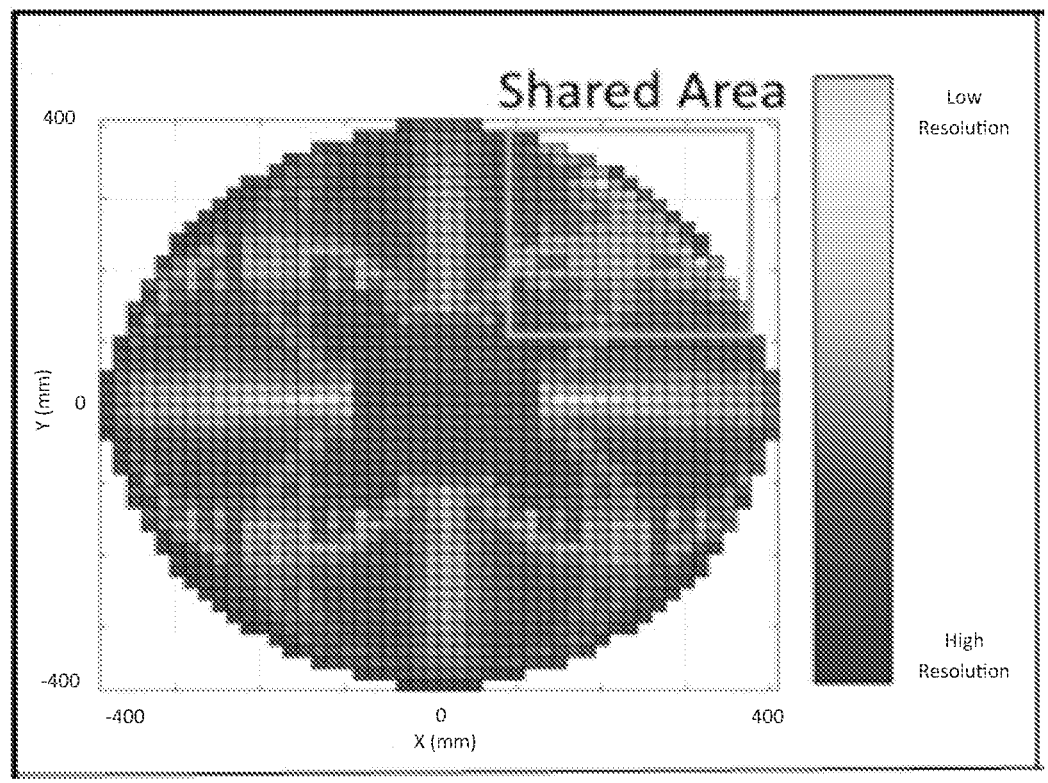
FIG. 8A depicts a heat map of the variable resolution in a single SCARA's operating window, highlighting the potential error propagation in the shared space.

The SCARA system dynamics is largely influenced by the angular velocity/acceleration of the joints traversing through the build area. FIG. 8A illustrates the robotic printing application's variable resolution via equation 1, which translates the inertial effects into cartesian space for a direct comparison to conventional gantry systems.

$$F^* \delta x = \tau^* \delta \theta \qquad (1)$$

F is the cartesian force-moment vector acting on the manipulator's end-effector, x, is an infinitesimal cartesian displacement of the end effector, τ, is a vector of torques at the joints, and θ is a vector of infinitesimal joint displacements [19]. As the SCARA traverses its path, the sudden change in joint velocities caused by shifting motor torque requirements directly affects the end product's dimensional accuracy. The plot highlights that the translational movement across the SCARA's horizontal and vertical axis hinders machine performance while a 45-degree rotation is generally favored, allowing smoother pat planning. Moreover, the X-axis suffers the largest performance discrepancies due to the primary angle motor possessing more torque via high gearing and higher joint rates. It is shown that traditional X and Y axes bisecting the rotation angle possess areas of worse resolution than that rotated by 45 degrees. For this reason, the printers are rotated to print within this area of higher resolution.

Figure 8B:
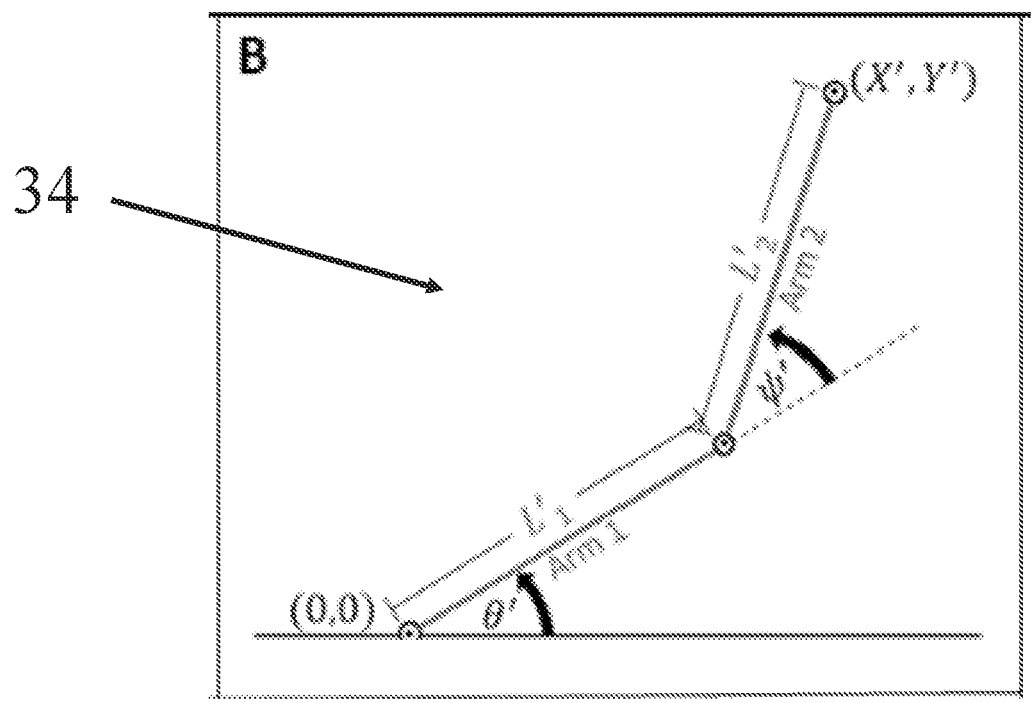
FIG. 8B depicts a SCARA diagram for resultant angles given position and link length offsets.

Nonuniformity of calibration part dimensioning is due to the propagation of inertial effects throughout the SCARA's operation. System traversal commands are issued through stepper motor ticks once cartesian coordinates are processed via inverse kinematic equations. Non-linear optimization of homing offset values is performed with attention paid to variable link lengths and cartesian tower offsets, the range of which can be seen in Table 1. Average position data from computer vision exhibits are fed into this optimization twice to receive convergence in theta and psi angular position offsets of arm 1 and 2 of SCARA 34 respectively, as shown in FIG. 8B.

TABLE 1

| Printer parameters for optimization | | | | |
|---|---|---|---|---|
| Tested parameter | Link 1 (mm) | Link 2 (mm) | Offset X (mm) | Offset Y (mm) |
| Initial value | 195 | 195 | 0 | −242.13 |
| Lower Bound | 150 | 150 | −100 | −300 |
| Upper Bound | 250 | 250 | 100 | −200 |

Figure 8C:
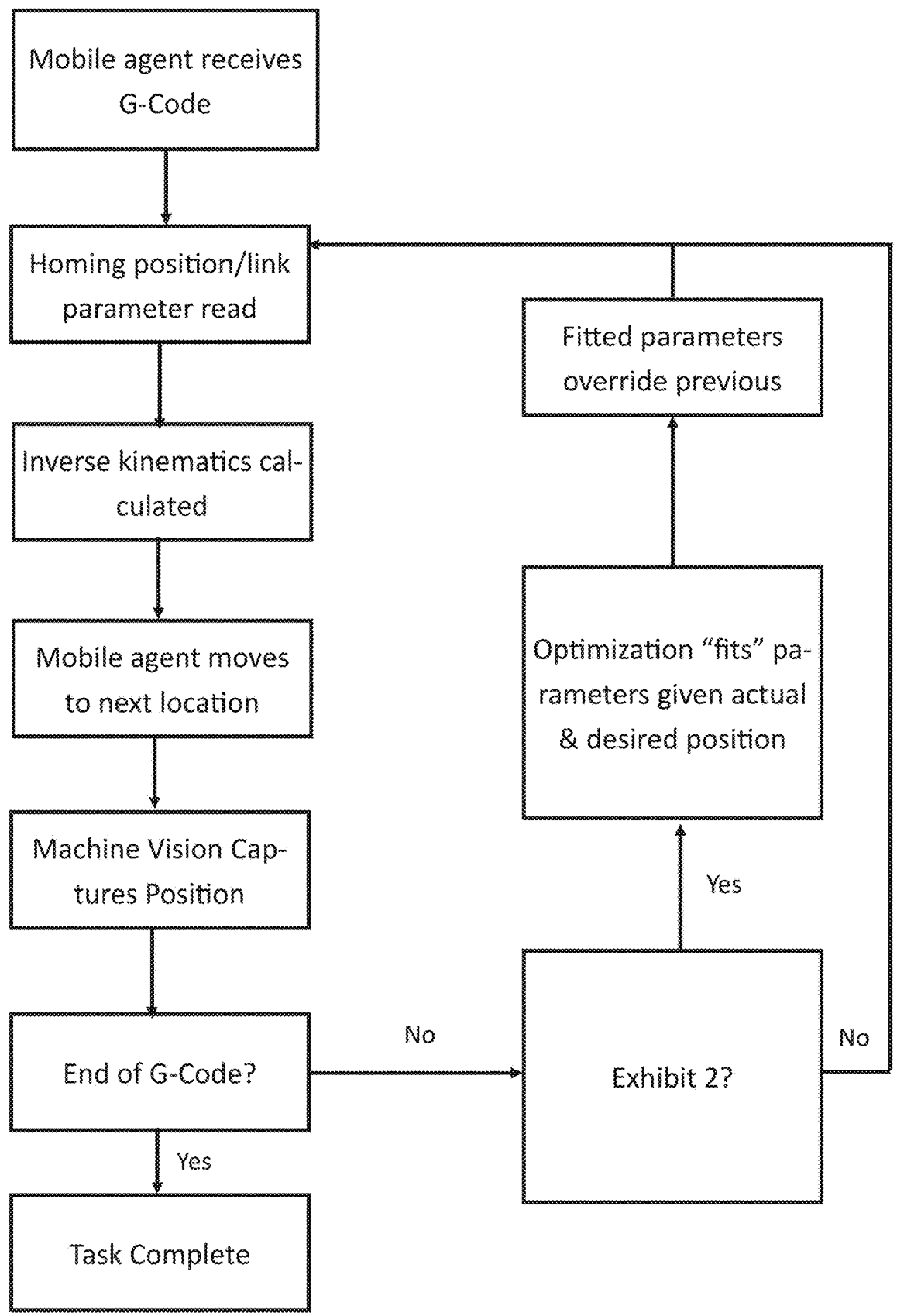
FIG. 8C depicts a flowchart of experimental implementation of smart calibration.
Figure 8D:
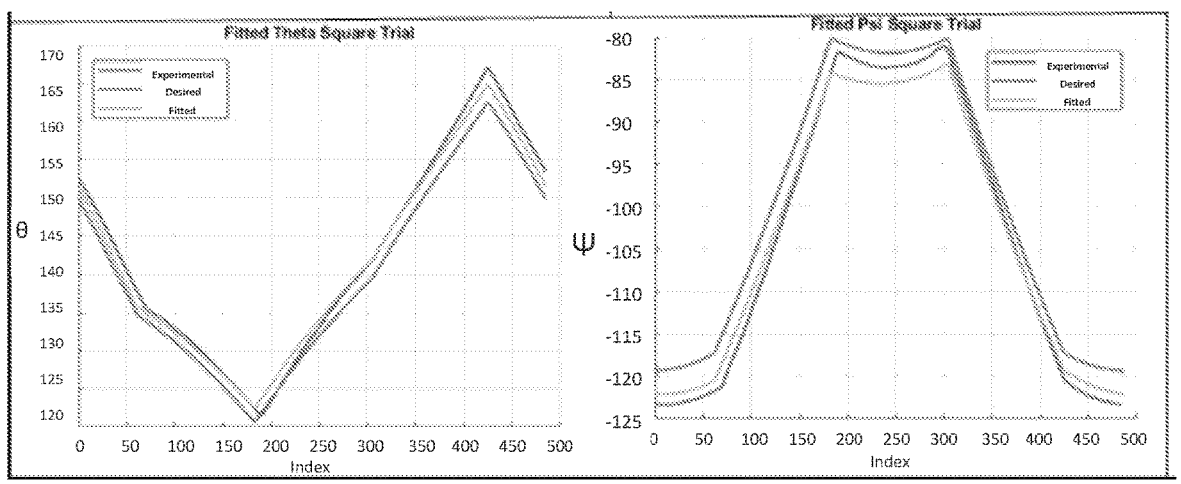
FIG. 8D depicts a graph of the actual, desired, and fitted angular position of a square end product.

Once the function converged to a set of offsets, both are flashed to the system firmware for the next iterations of exhibits with a smart calibration. Specifically. FIG. 8B shows the systems tower position's schematic and link length inputs with respect to the resulting angular position offsets detailed in equations 2-5. FIG. 8C shows the implementation flowchart of the non-linear optimization. FIG. 8D is a still frame of the desired position data compared to the experimental and fitted data.

$$X' = X + \delta Y \qquad (2)$$

$$Y' = Y + \delta Y \qquad (3)$$

$$L1' = L1 + \delta L1 \qquad (4)$$

$$L2' = L2 + \delta L2 \qquad (5)$$

Machine Vision Results

Figure 9:
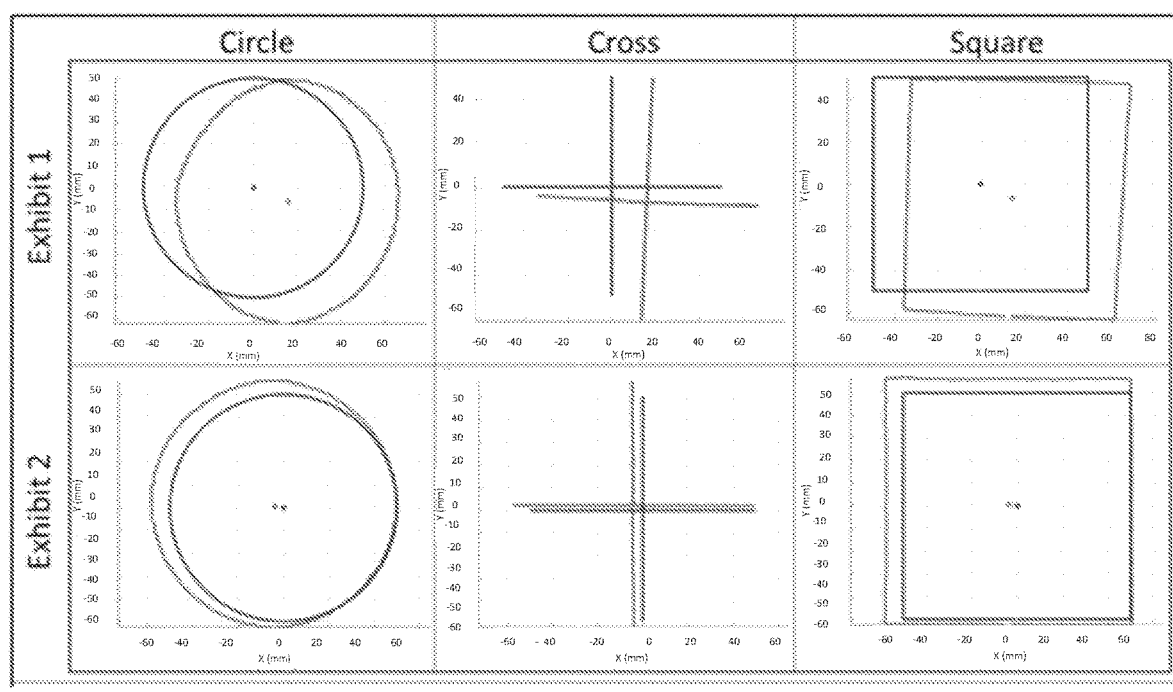
FIG. 9 depicts a graph showing the positional error of the mobile agent before calibration and after calibration.

Machine vision is used to quantify the results of printing with the SCARA mobile agent 10. FIG. 9 shows the extruder's desired path compared to the actual position for Exhibit 1 (before smart calibration offset) and Exhibit 2 (after smart calibration offset). Overall. Exhibit 1 shows a general skew to the bottom right of the desired printing area, the error in X being substantially larger than Y. Moreover, the circular test displays a higher frequency of oscillation as the tool head traverses the print spaces, a behavior expectedly caused by the motor stepping. Overall, such a substantial deviation from the desired path is enough to deform the end product shape, necessitating the use of a smart calibration process of correction. Using this trial data, the SCARA's proper offsets can be determined, as shown in Exhibit 2. Here, the path was consistently skewed to the upper left quadrant of the print area, albeit with a much smaller magnitude of error. Furthermore, the new circular trial appears much smoother than that of the previous trial. Despite the improvement, the remaining error indicates a slight alignment issue within the system itself. Specifically, the residual error is within the limits of the mechanical precision through the homing process, which is corrected by using high precision components (e.g., higher tolerance fasters and optical endstops).

Figure 10:
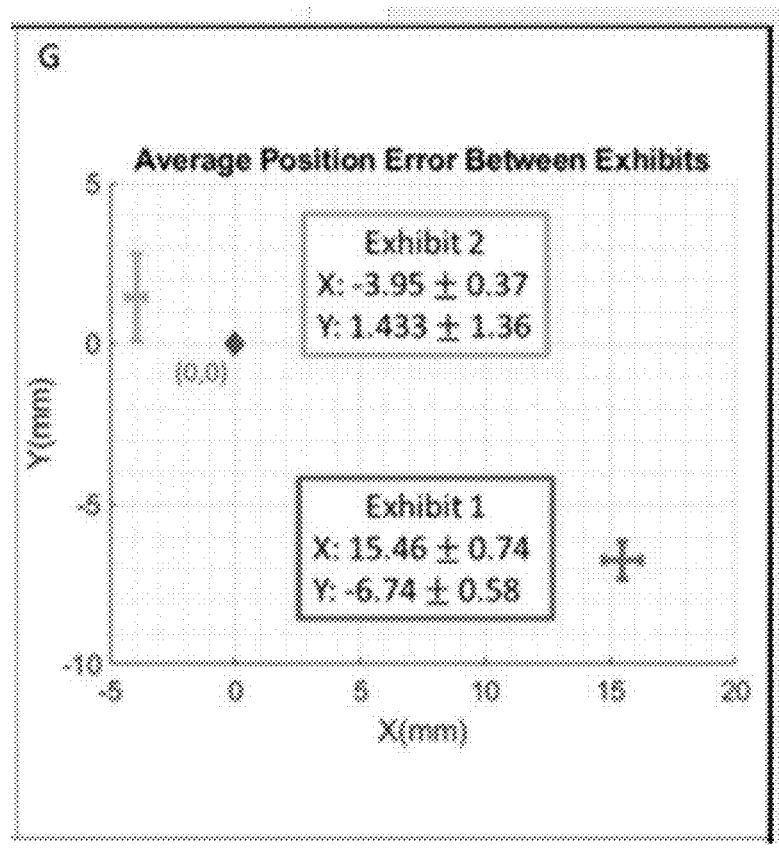
FIG. 10 depicts a graph showing the average total error for the first trial before calibration and after calibration shown in the second trial.
Figure 11:
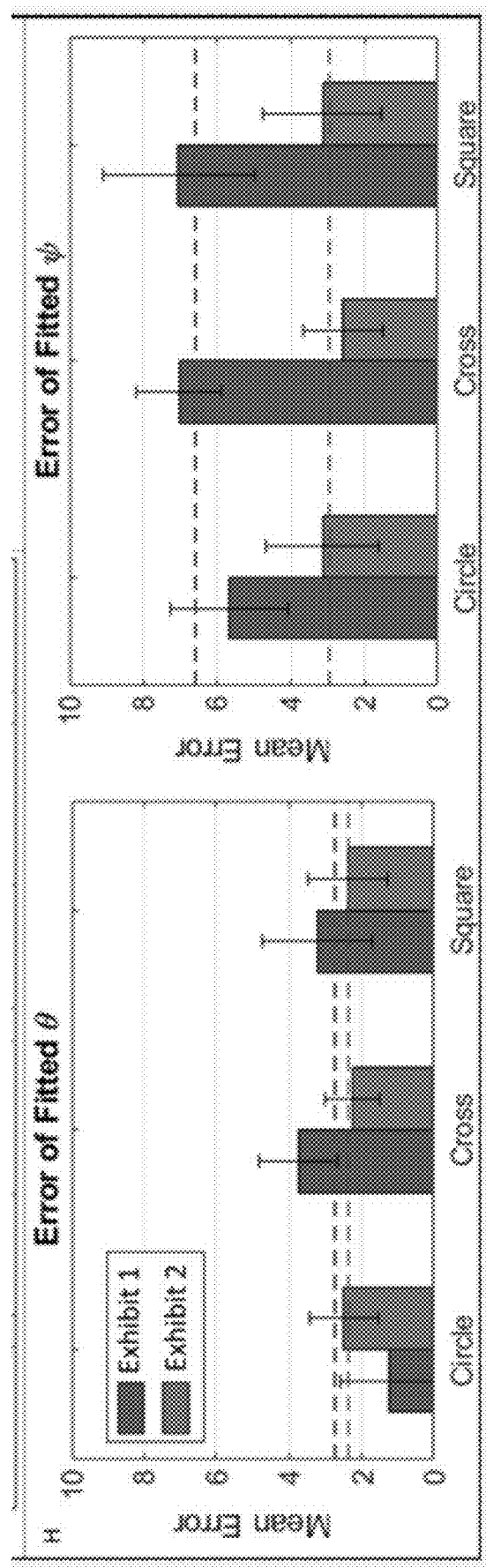
FIG. 11 depicts the positional error fitted theta across all shapes in Exhibit 1 (before smart calibration offset) and Exhibit 2 (after smart calibration offset).

The positional error between exhibits is seen in FIG. 10; the reduction of such witnessed in Exhibit 2 confirms the smart calibration process's effectiveness for printing. Specifically, there is a five times reduction in the error in X and around a three times reduction in error in Y. Moreover, it is shown that the standard deviation aligns with what is expected by the system's resolution. Exhibit 2 aligns closely with the vertical axis; therefore, it is prone to a more significant error variation in the Y direction. The non-linear optimization performed during smart calibration generates insight into the SCARA system parameters that affect error propagation, visualized in FIG. 11. Plotted is the discrepancy of the fitted model compared to the desired path, displaying the overall narrowing of positional error after the smart optimization occurs for both theta and psi offsets.

Furthermore, the average angle error is reduced dramatically by over 55.03% compared to 13.65% of average theta. Yet, psi error remains significantly high than theta through all fitted trials, even after optimization. This is the result of the outer link of the SCARA experiences higher inertial effects from translation than that of the inner becoming exaggerated over time as these effects propagate along with areas of low resolution. Overall, the smart optimization process successfully determines tower offsets of the system with respect to theta and psi. However, the same smart optimizing method shows negligible improvement over link length offsets.

Figure 12A:
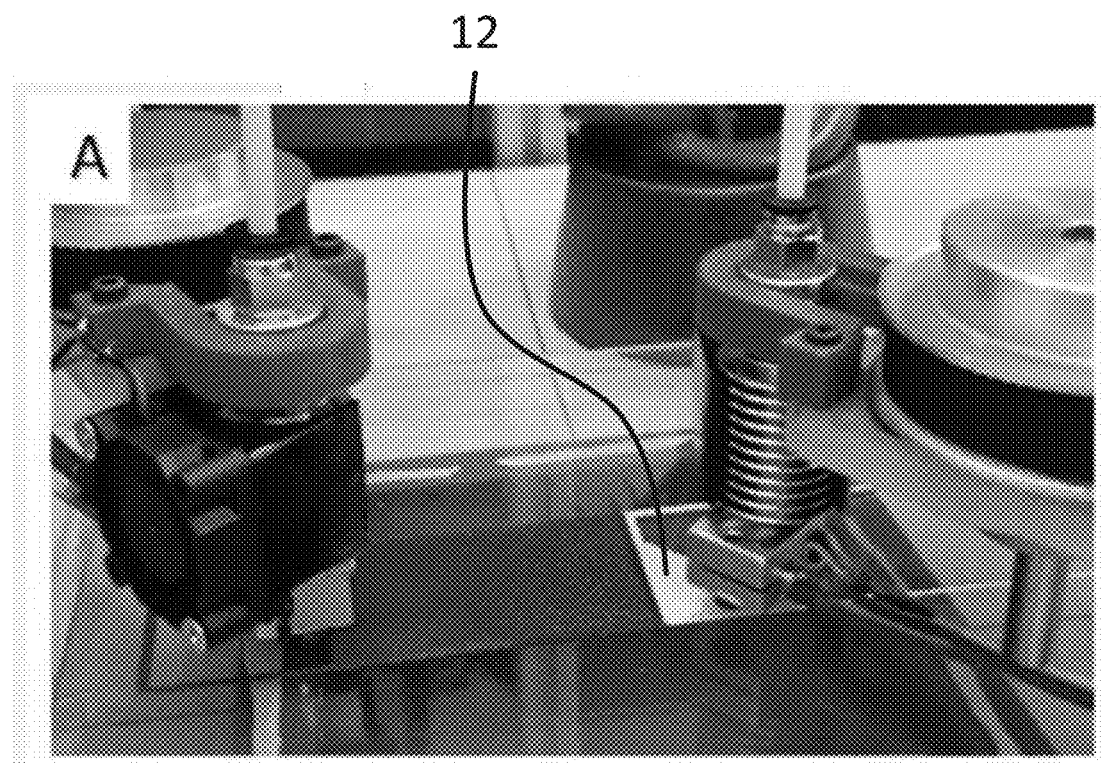
FIG. 12A depicts a collaboration between two SCARA to create a larger print area than a single SCARA can accomplish.
Figure 12B:
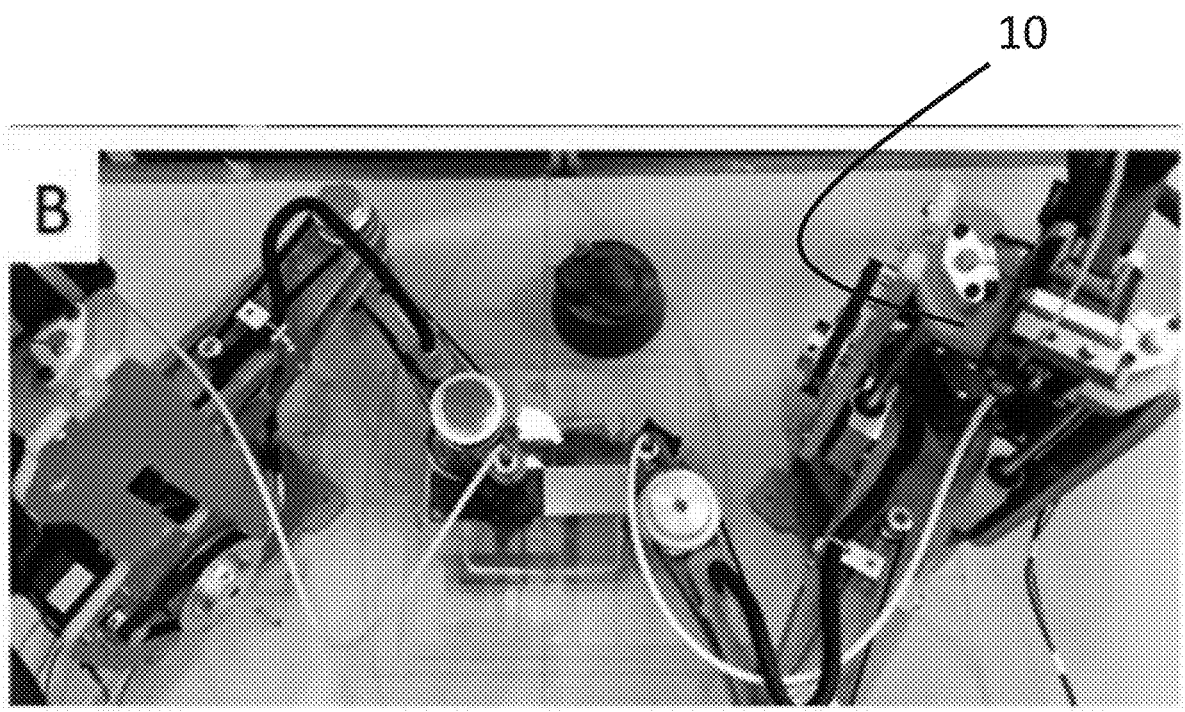
FIG. 12B is a top view of the SCARA working together on a rectangular end product.
Figure 12C:
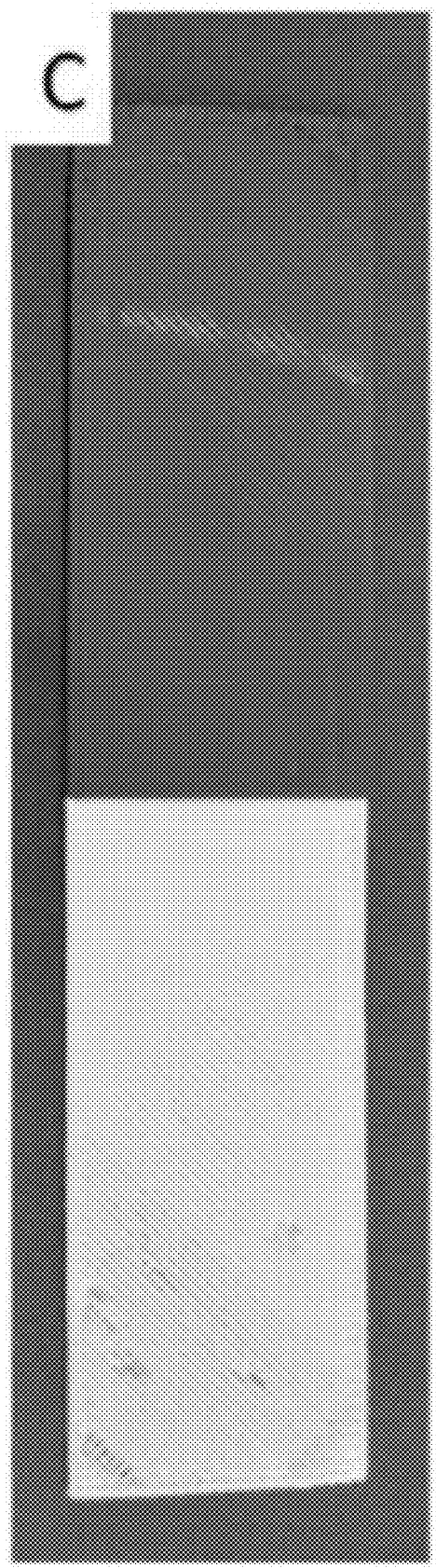
FIG. 12C depicts the rectangular end product being printed in FIG. 12B.

To demonstrate the ability for collaborative printing with the collaborative system, a single multi-material the end product is manufactured. Generally, the end product created with the collaborative system can be any shape that would fit within the print area that the two SCARAs could reach. The printing process is demonstrated in FIGS. 12A, and 12B. Specifically, FIG. 12A shows an above-view of two SCARAs 34 working together in a tight space—in this case, on an end product that is 40 mm by 180 mm. The printing begins with one SCARA 34, and then the second SCARA 34 starts the second side of end product 12 once second SCARA 34 is safe from colliding with the first SCARA arm. Each of SCARA 34 pause if SCARA 34 are about to work in the same print area to avoid a collision. Slight overlap in end product 12 printing allows for adhesion between the two prints, fusing end product's 12 two sides into a solid piece. Since each print line is laid sequentially, a zipper-like effect is seen at the seam between the two prints. Careful monitoring of potential collisions must take place to ensure that end product 12 is not disrupted during printing. The final end product 12 is shown in FIG. 12C. Furthermore, the final print time for a single SCARA 34 printing the same 40 mm by 180 mm end product was measured to be 18 minutes and 44 seconds, whereas the time to complete the same end product was 11 minutes and 57 seconds. This shows a near 36% reduction in time to produce the same end product using collaborative additive manufacturing.

Figure 12D:
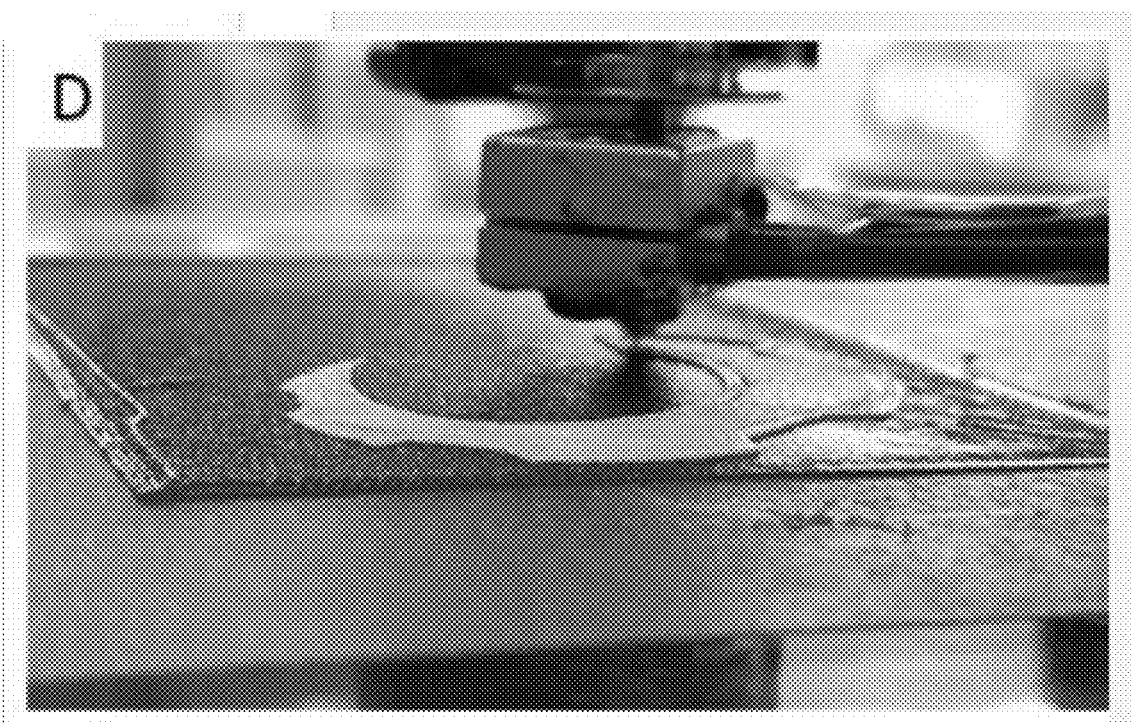
FIG. 12D depicts an image demonstrating that two SCARA are capable on working on the same print layer by layer fashion.
Figure 12E:
FIG. 12E depicts an image of a final end product.

An alternative to printing side by side is printing multiple materials within the same print area if seen in FIG. 12D. FIG. 12D is a single extruder printing a layer on top of a layer previously deposited by second SCARA 30. This allows for dual material printing without delay for changing materials. The final end product 12 can be seen in FIG. 12E.

Overall, collaborative additive manufacturing and selective material placement increase speed and functionality over current direct printing methods while maintaining design flexibility inherent to 3D printing. A SCARA manipulator framework, the collaborative system provides cooperative robotics to move into the AM realm. A cyber-physical system demonstrates autonomous mart calibration of parameters for improved manufacturing operations demonstrates that the AM capabilities of a small-scale SCARA is comparable to that of desktop 3D printers (e.g., gantry-style) on the market today. With the ability to interpret the positioning error during printing, the computer vision system allows for significant growth in real-time monitoring and corrective control theory, reducing overall error by approximately 75% in X and 80% in Y. Collaborative path planning between SCARA 34 mobile agents 10 successfully reduces the time to complete the printing of end products by 36%. Furthermore, the ability to add manipulators (n>2) allows for reconfigurable factories as compared to large-scale gantry sized printers, which are constrained to their original build size.

Collaborative Mobile Agent System

Figure 13A:
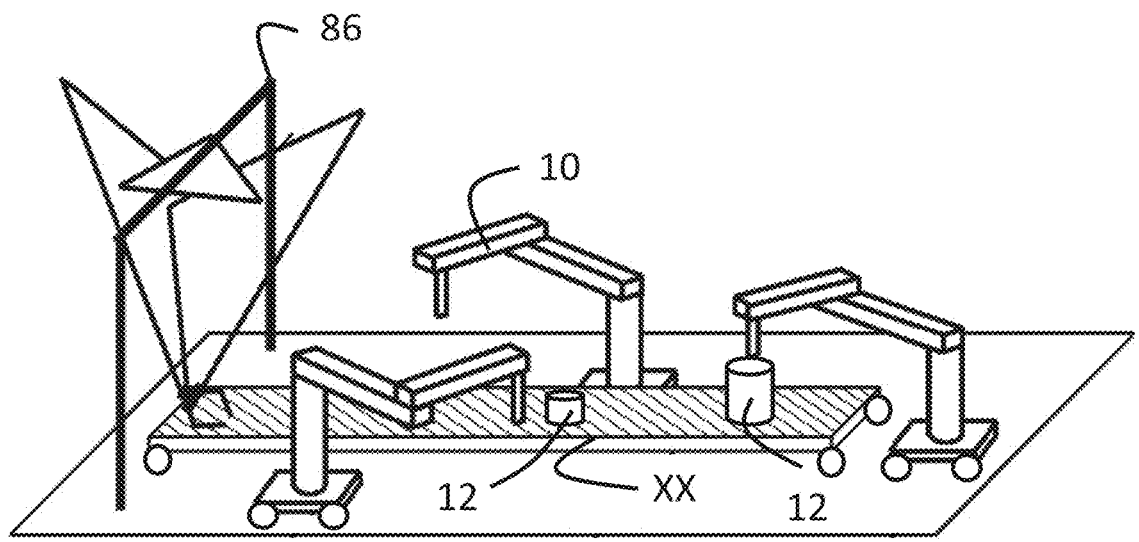
FIG. 13A is a perspective view of an embodiment of the manufacturing process utilizing mobile agent, conveyor belt, and delta robot to manufacture end products.
Figure 13B:
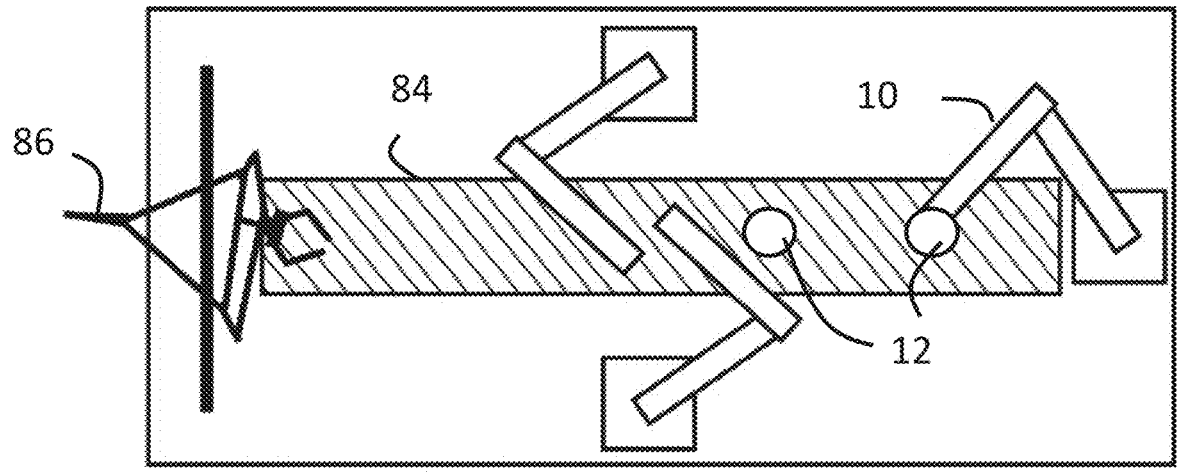
FIG. 13B is a top view of an embodiment of the manufacturing process utilizing mobile agents, a conveyor belt, and delta robots to manufacture end products.

FIGS. 13A and 13B illustrate an in-use embodiment of the manufacturing process in which mobile agents 10 collectively interact with each other, the environment, such as conveyor belt 84 and delta robot 86 to manufacture end product 12. During manufacturing, end product 12 is transported from delta robot 86 down conveyor belt 84 to be presented to mobile agents 10 positioned strategically about conveyor belt 84. Moreover, one or more delta robots 86 and one or more mobile agents 10 may be disposed along the length of conveyor belt 84. In an embodiment, conveyor belt 84 may be print bed 74, such that print bed 74 presents end product 12 part to each mobile agent 10 rather than conveyor belt 84 depicted in FIGS. 13A, and 13B.

Figure 14:
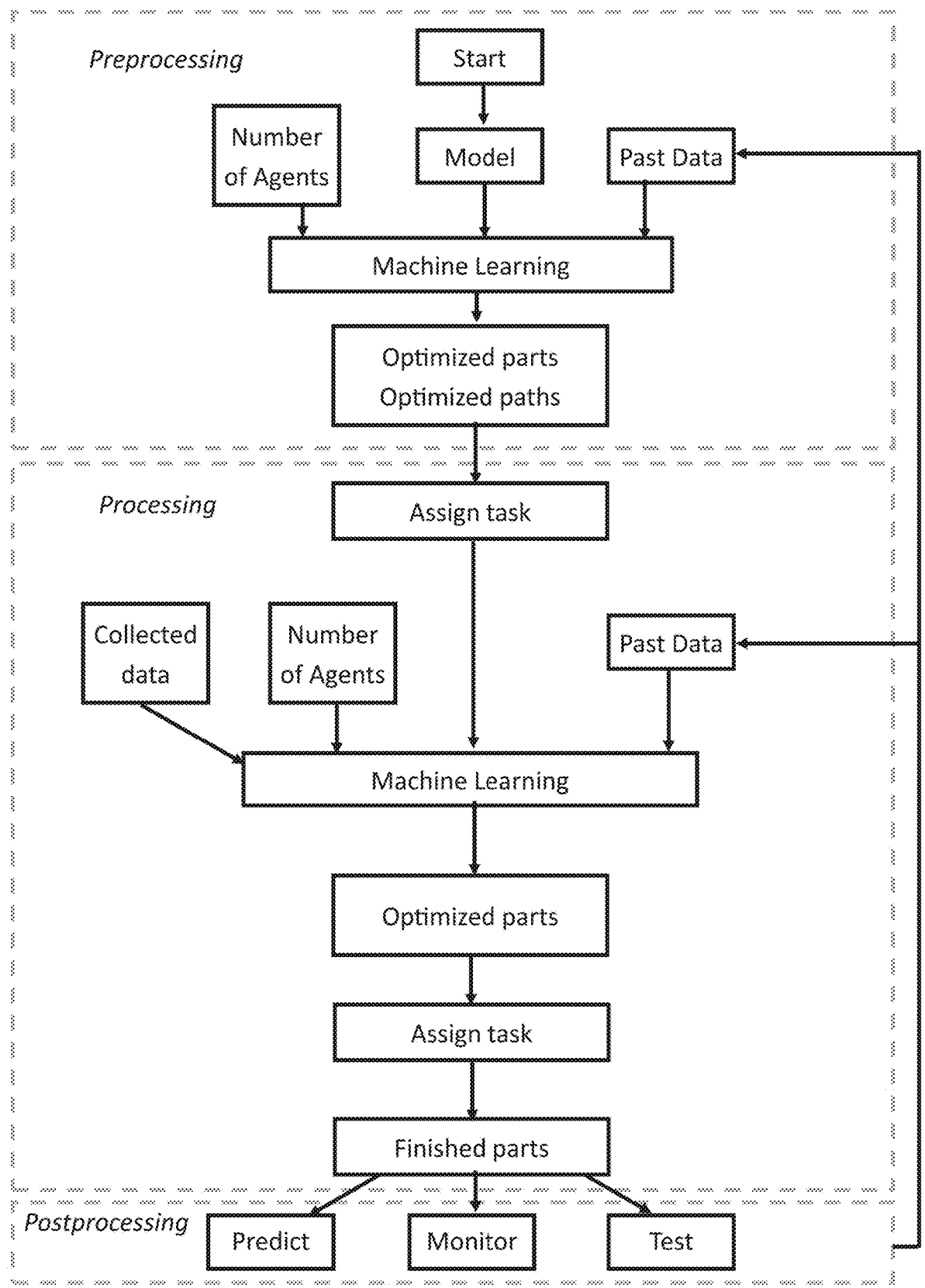
FIG. 14 is a process flow chart diagram depicting the pre-processing, processing, and post post-processing stages of manufacturing an end product.

Pre-processing, as illustrated in FIG. 14, builds upon previously learned data gathered during previous manufacturing runs. Intelligent product design commences as a function of the number of mobile agents 10 upon a base model. Conditions such as materials used, intended operations, and desired performance contribute to path planning and task scheduling amongst mobile agents 10. Pre-processing includes using neural networks to assign different levels of priority through a large variety of variables/tasks using previously learned data. This results in end product 12 being optimized for function and produced efficiently.

Active network sensing will detect irregularities and signals to learn control systems for on-the-fly course correction during the processing stage. With different modes of failure possible, various concurrent learning streams can be justified, such as neural networks and behavior trees. Here, each segment of the manufacturing process provided data to improve the overall performance of end product 12.

Figure 15:
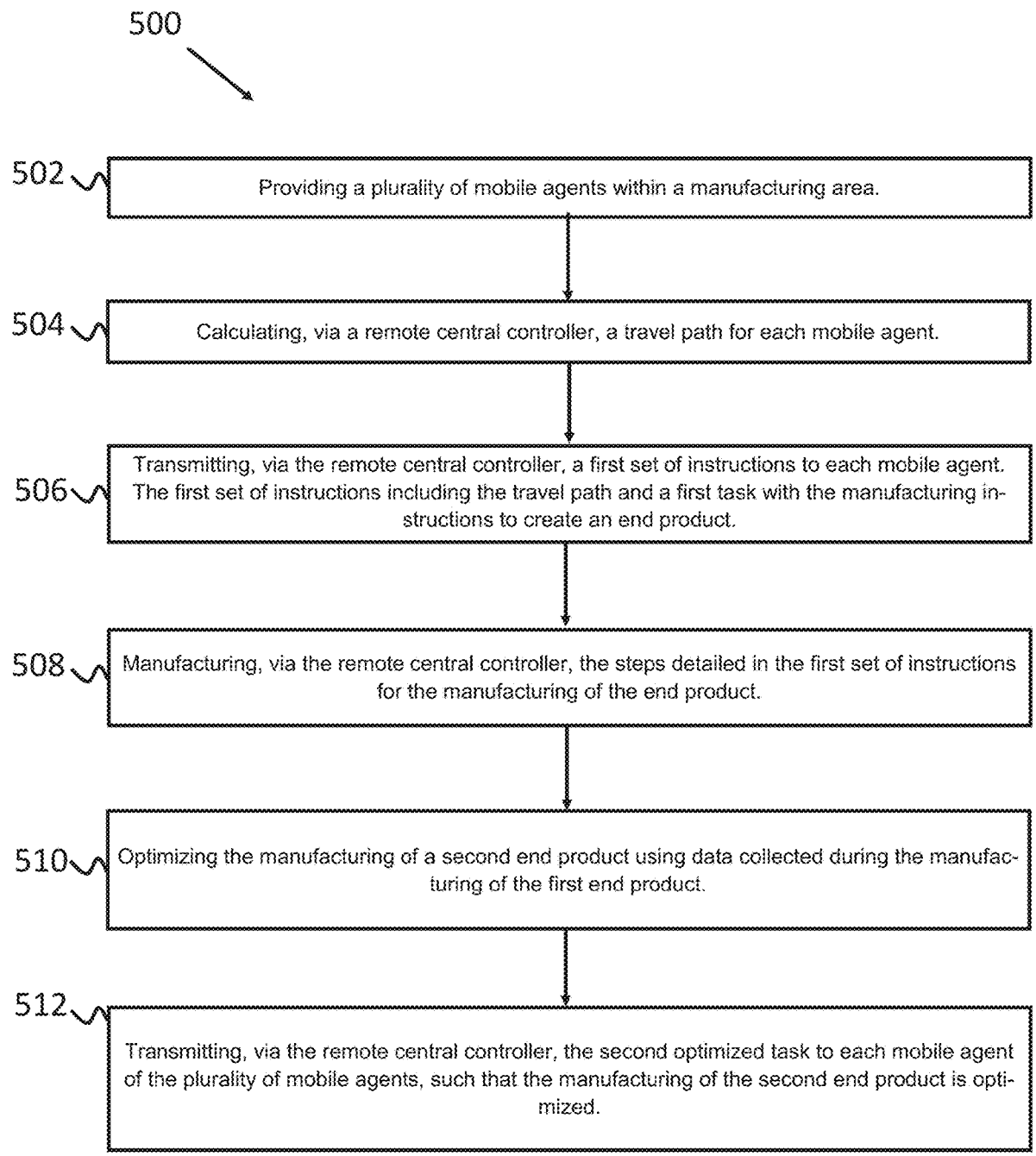
FIG. 15 is a flow chart diagram depicting a method of manufacturing an end product using a swarm of mobile agents.
Figure 15:
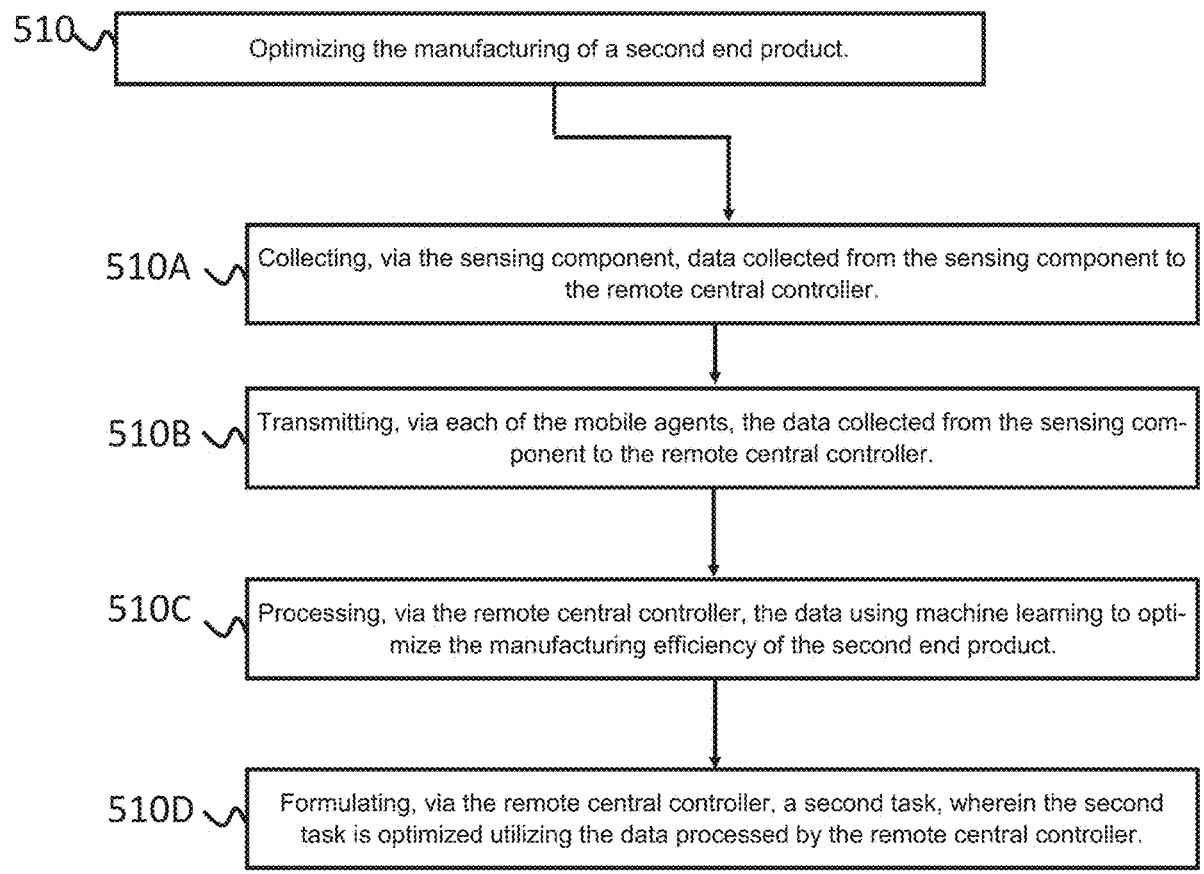

FIG. 15 depicts a method of manufacturing a product using a swarm of mobile agents 10. The steps delineated in the exemplary process flow diagram of FIG. 15 are merely exemplary of a preferred order to reduce overall build time and increase the quality of end product 12. The steps may be carried out in another order, with or without additional steps included therein. Additionally, the steps may be carried out with an alternative embodiment of mobile agents 10, as contemplated in the description above.

The method of manufacturing end product 12 using a swarm of mobile agents 10 begins at step 502, during which a plurality of mobile agents 10 is provided within a predetermined manufacturing area 14. Each mobile agent. 10 of the plurality of mobile agents 10, includes the components discussed above. In step 504, a travel path for each mobile agent 10 is calculated via remote central controller 54 and optimized to reduce end product's 10 manufacturing time. Next, in step 506, the first set of instructions is transmitted via remote central controller 54 to each mobile agent 10. The first set of instructions includes the travel path and a first task having the manufacturing instructions for end product 12 being manufactured by mobile agents 10 within manufacturing area 14. In step 508, the first end product 12 is manufactured via mobile agents 10 based on the first set of instructions received by each mobile agent 10. In step 510, the manufacturing process is optimized for manufacturing a second end product 12—the optimizing proceeds at step 510A by collecting data via a sensing component, such as ultrasound device 58. At step 510B, the data is then transmitted to remote central controller 54, where it is processed at step 510C using machine learning to optimize the manufacturing efficiency of the second or subsequent end products 12 being manufactured by mobile agents 10. Using the data processed in step 510C, a second task 510D is formulated by remote central controller 54 containing optimized manufacturing instructions for end product 12. Finally, in step 512, the second task is transmitted to and carried out by mobile agents 12 within manufacturing area 14 to create an optimized end product 20 based on the previous end product 12 manufactured.

REFERENCES

[1] "3D Printing|Wohlers Associates." [Online]. Available: https://wohlersassociates.com/. [Accessed: 29 Nov. 2019].
[2] A. Gunasekaran, Y. Y. Yusuf, E. O. Adeleye, T. Papadopoulos, D. Kovvuri, and D. G. Geyi, "Agile manufacturing: an evolutionary review of practices," *Int. J. Prod. Res.*, vol. 57, no. 15-16, pp. 5154-5174, August 2019, doi: 10.1080/00207543.2018.1530478.
[3] T. D. Ngo, A. Kashani, G. Imbalzano, K. T. Q. Nguyen, and D. Hui, "Additive manufacturing (3D printing): A review of materials, methods, applications and challenges," *Compos. Part B Eng.*, vol. 143, pp. 172-196, June 2018, doi: 10.1016/j.compositesb.2018.02.012.
[4] J. Gardan, "Additive manufacturing technologies: state of the art and trends," *Int. J. Prod. Res.*, vol. 54, no. 10, pp. 3118-3132, May 2016, doi: 10.1080/00207543.2015.1115909.
[5] R. Alami, S. Fleury, M. Herrb, F. Ingrand, and F. Robert, "Multi-robot cooperation in the MARTHA project," *IEEE Robot. Autom. Mag.*, vol. 5, no. 1, pp. 36-47, March 1998, doi: 10.1109/100.667325.
[6] J. Casper and R. R. Murphy, "Human-robot interactions during the robot-assisted urban search and rescue response at the World Trade Center," *IEEE Trans. Syst. Man Cybern. Part B Cybern.*, vol. 33, no. 3, pp. 367-385, June 2003, doi: 10.1109/TSMCB.2003.811794.
[7] F. A. Auat Cheein and R Carelli, "Agricultural Robotics: Unmanned Robotic Service Units in Agricultural Tasks," *IEEE Ind. Electron. Mag.*, vol. 7, no. 3, pp. 48-58, September 2013, doi: 10.1109/MIE.2013.2252957.
[8] I. S. Kulkarni and D. Pompili, "Task allocation for networked autonomous underwater vehicles in critical missions," *IEEE J. Sel. Areas Commun.*, vol. 28, no. 5, pp. 716-727, June 2010, doi: 10.1109/JSAC.2010.100609.
[9] H. Al Jassmi, F. Al Najjar, and A.-H. I. Mourad, "Large-Scale 3D Printing: The Way Forward," *IOP Conf. Ser. Mater. Sci. Eng.*, vol. 324, p. 012088, March 2018, doi: 10.1088/1757-899X/324/1/012088.
[10] J. McPherson and W. Zhou, "A chunk-based slicer for cooperative 3D printing," *Rapid Prototyp. J.*, vol. 24, no. 9, pp. 1436-1446, November 2018, doi: 10.1108/RPJ-07-2017-0150.
[11] N. Oxman, J. Duro-Royo, S. Keating, B. Peters, and E. Tsai, "Towards Robotic Swarm Printing," *Archit. Des.*, vol. 84, no. 3, pp. 108-115, May 2014, doi: 10.1002/ad.1764.
[12] A. Djuric and R. J. Urbanic, "Using collaborative robots to assist with travel path development for material deposition based additive manufacturing processes," *Comput.-Aided Des. Appl.*, vol. 15, no. 4, pp. 542-555, July 2018, doi: 10.1080/16864360.2017.1419642.
[13] N. R. Fry, R. C. Richardson. and J. H. Boyle, "Robotic additive manufacturing system for dynamic build orientations," *Rapid Prototyp. J.*, vol. ahead-of-print, no. ahead-of-print, January 2020, doi: 10.1108/RPJ-09-2019-0243.
[14] J. Heilala and P. Voho, "Modular reconfigurable flexible final assembly systems," *Assem. Autom.*, vol. 21, no. 1, pp. 20-30, January 2001, doi: 10.1108/01445150110381646.
[15] H. Panetto, B. Iung, D. Ivanov, G. Weichhart, and X. Wang, "Challenges for the cyber-physical manufacturing enterprises of the future," *Annu. Rev. Control*, vol. 47, pp. 200-213, 2019, doi: 10.1016/j.arcontrol.2019.02.002.
[16] J. Frketic, T. Dickens. and S. Ramakrishnan, "Automated manufacturing and processing of fiber-reinforced polymer (FRP) composites: An additive review of contemporary and modern techniques for advanced materials manufacturing," *Addit. Manuf.*, vol. 14, no. Supplement C, pp. 69-86, March 2017, doi: 10.1016/j.addma.2017.01.003.
[17] J. J. Laureto and J. M. Pearce, "Open Source Multi-Head 3D Printer for Polymer-Metal Composite Component Manufacturing," *Technologies*, vol. 5, no. 2, p. 36, June 2017, doi: 10.3390/technologies5020036.
[18] M. Manoharan and S. Kumaraguru, "Path Planning for Direct Energy Deposition with Collaborative Robots: A Review," in 2018 *Conference on Information and Communication Technology (CICT)*, Jabalpur, India, 2018, pp. 1-6, doi: 10.1109/INFOCOMTECH.2018.8722362.
[19] F. A. Auat Cheein and R. Carelli, "Agricultural Robotics: Unmanned Robotic Service Units in Agricultural Tasks," *IEEE Ind. Electron. Mag.*, vol. 7, no. 3, pp. 48-58, September 2013, doi: 10.1109/MIE.2013.2252957.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A swarm system including a plurality of mobile agents each in communication with an independent remote central controller, wherein the plurality of mobile agents are configured to manufacture an end product within a manufacturing area, the swarm system comprising:
 a first mobile agent including:
  a frame including a first side opposite a second side, the frame defining a compartment therein between the first side and the second side, the compartment enclosed within the frame via one or more detachable sides removably coupled to the frame;

a sensing component removably disposed within the compartment, wherein the sensing component is adapted to be in wireless communication with the independent remote central controller and is adapted to transmit data to the independent remote central controller;

a receiver removably disposed within the compartment, wherein the receiver is adapted to receive a set of instructions from the independent remote central controller, the set of instructions based on the data transmitted by the sensing component;

a base plate secured to the first side of the frame;

an attachment coupled to the base plate, such that the attachment is secured to the frame, the attachment including an end effector disposed at a terminal end of the attachment and adapted to manufacture the end product within the manufacturing area, and a wheel coupled to the second side of the frame, the wheel configured to linearly translate the first mobile agent from a first position to a second position within the manufacturing area based on the set of instructions;

a second mobile agent including:
a frame including a first side opposite a second side;
a wheel coupled to the second side of the frame, the wheel configured to linearly translate the second mobile agent from a first position to a second position within the manufacturing area; and
a print bed including a bottom surface secured to the first side of the frame, the bottom surface opposite a top surface, the top surface forming a printing surface configured to provide a surface for a deposit of a material in the form of a filament, thereby manufacturing an end product on the top surface of the print bed, wherein the first mobile agent is configured to manufacture the end product on the print bed of the second mobile agent based on the set of instructions received by the first mobile agent from the remote central controller.

2. The swarm system of claim 1, wherein the attachment is a mobile inkjet printer, the inkjet printer including a gantry support structure secured to the base plate, the gantry support structure supporting a print head thereon, the print head configured to translate in an x-axis, y-axis, and z-axis with respect to the base plate, wherein the inkjet printer is configured to print the end product on the print bed of the second mobile agent.

3. The swarm system of claim 1, wherein the first mobile agent further comprises a second attachment coupled to the base plate, such that the second attachment is secured to the frame, the second attachment being a robotic arm adapted to manufacture the end product.

4. The swarm system of claim 1, wherein the end effector of the attachment of the first mobile agent is a print head configured to deposit an amount of a filament onto the print bed of the second mobile agent, such that the print head of the first mobile agent is configured to manufacture the end product on the print bed of the second mobile agent.

5. The swarm system of claim 4, further comprising:
a third mobile agent including:
a frame having a first side opposite a second side;
a wheel coupled to the second side of the frame and configured to linearly translate the third mobile agent from a first position to a second position within the manufacturing area;
a gantry support secured to the first side of the frame, the gantry support coupled to a print head that is configured to deposit the filament to the top surface of the print bed of the second mobile agent;
wherein each of the first and the third mobile agents are configured to manufacture the end product on the print bed of the second mobile agent based on the set of instructions received by the first mobile agent from the independent remote central controller.

6. The swarm system of claim 1, wherein the print bed of the second mobile agent further includes an adhesive disposed on the top surface of the print bed, the adhesive configured to prevent the end product from being displaced during the manufacturing process.

7. The swarm system of claim 1, wherein the first mobile agent further comprises an ultrasonic detector configured to calculate a void content within the end product.

8. The swarm system of claim 1, wherein the attachment of the first mobile agent is a robotic arm having a motor configured to control the movement of the robotic arm within the manufacturing area, further comprising:
a microphone in mechanical communication with the frame of the first mobile agent, the microphone adapted to analyze an acoustical energy generated by the motor during operation of the robotic arm, wherein the acoustical energy received by the microphone is transmitted to the remote central controller to optimize the manufacturing of the end product.

9. The swarm system of claim 1, wherein the first mobile agent further comprises a camera in mechanical communication with the frame of the first mobile agent and configured to capture video data within the manufacturing area, wherein the video data is wirelessly transmitted to the independent remote central controller to optimize the manufacturing of the end product.

10. The swarm system of claim 1, wherein the wheel of each of the first and second mobile agents is an omnidirectional wheeling that permits each of the first and second mobile agents to independently linearly translate within the manufacturing area.

* * * * *